United States Patent
Sowa et al.

(10) Patent No.: US 7,787,003 B2
(45) Date of Patent: Aug. 31, 2010

(54) IMAGE FORMING APPARATUS

(75) Inventors: Takeshi Sowa, Nagano (JP); Masayuki Kanazawa, Nagano (JP); Yoichi Mitsui, Nagano (JP); Takatomo Fukumoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 780 days.

(21) Appl. No.: 11/407,857

(22) Filed: Apr. 19, 2006

(65) Prior Publication Data

US 2007/0024690 A1 Feb. 1, 2007

(30) Foreign Application Priority Data

| Apr. 21, 2005 | (JP) | ............................ P2005-123155 |
| Apr. 21, 2005 | (JP) | ............................ P2005-123156 |
| Apr. 21, 2005 | (JP) | ............................ P2005-123157 |
| Apr. 21, 2005 | (JP) | ............................ P2005-123158 |
| May 13, 2005 | (JP) | ............................ P2005-140620 |
| May 13, 2005 | (JP) | ............................ P2005-140621 |
| May 23, 2005 | (JP) | ............................ P2005-148972 |

(51) Int. Cl.
*B41J 2/385* (2006.01)
*B41J 2/41* (2006.01)
*B41J 2/435* (2006.01)

(52) U.S. Cl. .................... 347/138; 347/152; 347/245; 347/263

(58) Field of Classification Search ............... 347/245, 347/263; 399/92, 93
See application file for complete search history.

(56) References Cited

U.S. PATENT DOCUMENTS

| 5,952,649 | A | 9/1999 | Amada |
| 6,501,922 | B2 * | 12/2002 | Ihara et al. ..................... 399/92 |
| 6,937,830 | B2 | 8/2005 | Satoh |
| 2003/0210922 | A1 * | 11/2003 | Serizawa et al. .............. 399/96 |
| 2004/0052545 | A1 | 3/2004 | Satoh |
| 2005/0074254 | A1 | 4/2005 | Maeda |

FOREIGN PATENT DOCUMENTS

| JP | 57066416 A | 4/1982 |
| JP | 62235865 A | 10/1987 |
| JP | 05-236214 | 9/1993 |
| JP | 09164718 A | 6/1997 |
| JP | 11160895 A | 6/1999 |
| JP | 2001318577 A | 11/2001 |
| JP | 2002196635 A | 7/2002 |

OTHER PUBLICATIONS

European Search Report for corresponding European application 06008303.7-2209 lists the references above.
European search report for corresponding European application 06008303.7-2209 lists the references above.

* cited by examiner

*Primary Examiner*—Matthew Luu
*Assistant Examiner*—Kendrick X Liu
(74) *Attorney, Agent, or Firm*—Hogan Lovells US LLP

(57) ABSTRACT

An image forming apparatus including: a photoconductor, adapted such that an electrostatic latent image is formed thereon and extending in a first direction; and an optical scanner, operable to emit a light beam to expose the photoconductor while scanning in the first direction, wherein: the photoconductor and the optical scanner define a space therebetween; and the space allows air to flow therethrough in the first direction.

4 Claims, 21 Drawing Sheets

DORP IN QUANTITY OF REFLECTED LIGHT
CAUSED BY STAINS ON REFLECTION FACES

POSITIONS ON REFLECTION FACES
(INDICATED WITH WRITE START POSITION BEING TAKEN AS 0
AND WRITE END POSITION BEING TAKEN AS 1)

IMAGE FORMING APPARATUS

BACKGROUND OF THE INVENTION

1. Technical Field of the Invention

The present invention relates to an image forming apparatus which prevents occurrence of inconsistencies in density or color of an image.

2. Description of the Related Art

In the field of an image forming apparatus such as a printer, a known optical scanning device is of a type where an optical beam to be caused to enter, e.g., a light-deflecting reflector of a rotary polygon mirror, or the like, and a deflected light beam reflected from the light-deflecting reflector are reflected by a mirror. This optical scanning device is provided with a window which allows an exit of a light beam to a surface to be scanned (hereinafter called a "scan subject surface") such as an image carrier (a photo conductor).

FIGS. 15A to 15C are explanatory views each showing an example image forming apparatus having such an optical scanning device. FIG. 15A is a diagrammatic front view of the image forming apparatus; FIG. 15B is a side view of the same; and FIG. 15C is a diagrammatic front view showing another configuration of the image forming apparatus. In FIGS. 15A and 15B, reference numeral 5 designates a photo conductor; 6 designates a beam exit window; 16 designates a deflected light beam; 17 designates a scanning line; 20 designates an optical scanning device; 52 designates a duct; 53 designates a fan for sucking out air currents (hereinafter called an "exhaust fan"); 55 designates a cleaner for collecting unwanted toner adhering to the photo conductor 5; 57 designates an inflow side of the air currents circulating around the beam exit window 6; and 58 designates an outflow side by way of which the air currents flow to the outside.

In the electrophotographic process, a space—through which a write beam emitted from the optical scanning device toward the photo conductor passes—is in close proximity to an charging device and a development unit, which are omitted from the illustrations, and the photo conductor 5. There may arise a case where air currents are caused to flow in the space as a measure against ozone or splashes of toner. There is performed processing of activating the exhaust fan 53, such as that shown in FIG. 15A, to thus cause the air currents to flow around the beam exit window 6 by way of the duct 52 and to pass through a filter or the like. Thus, the exhaust fan 53 is disposed in a position downstream of the air currents flowing thereabout and has the function of sucking out the air currents existing around the beam exit window 6.

FIG. 15C shows an example using an intake fan 54 in lieu of the exhaust fan 53. The intake fan 54 is disposed at a position upstream of the air currents flowing around the beam exit window 6 and has the function of drawing the air currents to the neighborhood of the beam exit window 6. The exhaust fan 53 or the intake fan 54 can be arbitrarily selected as a measure against ozone in consideration of the space where components of the image forming apparatus are arranged.

When the image forming apparatus operates, the beam exit window 6 of the optical scanning device 20 is stained by fine powder, such as splashes of toner, with lapse of time, which in turn induces a drop in the power of light arriving at the photo conductor 5. When the exhaust fan 53 or the intake fan 54 is activated, minute dust, such as splashes of toner, adheres to the beam exit window 6 while being carried on the air currents, to thus decrease the quantity of light (power of light) reaching the photo conductor 5. A decrease in the power of light results in an increase in the density of an image, which in turn induces inconsistencies in density.

FIG. 16 is a descriptive view showing a decrease in the quantity of light stemming from stains on the beam exit window 6. FIG. 16(a) corresponds to FIG. 15A. FIG. 16(b) is a characteristic chart showing time-varying changes in stains on the beam exit window 6, wherein the degree of stain is great in the direction of CH but low in the direction of CL. Reference numeral 18 designates the height of an image. FIG. 16(c) is a characteristic chart showing time-varying changes in the quantity of light induced by stains on the beam exit window 6, wherein the quantity of light is high in the direction of VH but low in the direction of VL. Broken line Vx designates the distribution of the initial quantity of light, and solid line Vy designates the distribution of light quantity acquired with lapse of time. As shown in FIG. 16, the degree of stain is large downstream of the air currents circulating through the neighborhood of the beam exit window 6, and the quantity of light is decreased. Next, the reason for this will be described.

In FIG. 16(a), a fine powder, such as the toner having passed through a cleaner of the photo conductor 5, intrudes into the duct 52 provided as a measure against ozone while adhering to the photo conductor 5, and is conveyed downstream while being carried on the air currents in the duct 52. The fine powder in the duct 52 adheres to the beam exit window 6 to thus stain the same, which in turn results in a drop in the quantity of light. Especially, the density of contaminants is increased downstream of the air currents, so that stains on the beam exit window 6 are likely to become worse. As shown in FIG. 16(c), comparison of the air currents blowing over the beam exit window 6 at a downstream position Ab with the air currents blowing over the beam exit window 6 at an upstream position Aa shows that the drop in the quantity of light caused with lapse of time in the position Ab becomes greater.

When the air currents, such as that mentioned previously, has arisen in the axial direction of the photo conductor, stains on the beam exit window of the optical scanning device become noticeable especially at a downstream position of the air currents. There may arise a case where fluctuations occur in the quantity of writing light in the axial direction of the photo conductor, thereby inducing inconsistencies in the density of a printed image. However, the related-art image forming apparatus has not been provided with a measure against a drop in the quantity of light attributable to stains on the beam exit window such as that mentioned previously. Therefore, the related-art image forming apparatus encounters a problem of a failure to prevent deterioration of image quality.

Furthermore, in the field of an image forming apparatus such as a printer, there is an another case where a non-contact charging device is used as charging means. FIGS. 17A to 17C are explanatory views each showing an example of such an charging device. FIG. 17A is a diagrammatic front view of the charging device; FIG. 17B is a side view of the same; and FIG. 17C is a diagrammatic front view showing the charging device of another configuration. In FIGS. 17A and 17B, reference numeral 5 designates a photoconductor; 51 designates an charging device; 52 designates a duct; 53 designates an exhaust fan; 55 designates a cleaner for collecting the unwanted toner adhering to the photoconductor 5; 57 designates an inflow side of air currents circulating around the charging device 51; 58 designates an outflow side of the air currents; and 20 designates an optical scanning device for scanning the photoconductor through use of a deflected light beam 16.

Since a high voltage is applied to the charging device 51, there is a problem of ozone developing around the charging device. The exhaust fan 53, such as that shown in FIG. 17A, is activated as an example of a measure against ozone, to thus cause air to flow around the charging device 51 by way of the duct 52 and pass through a filter, or the like. As mentioned above, the exhaust fan 53 is disposed downstream of the air currents flowing around the charging device, and has the function of sucking the air currents present around the charging device.

FIG. 17C shows an example where an intake fan 54 is used in lieu of the exhaust fan 53. The intake fan 54 is disposed in a position upstream of the air currents flowing around the charging device and has the function of blowing the air current into the neighborhood of the charging device. The exhaust fan 53 or the intake fan 54 can be arbitrarily selected as a measure against ozone in consideration of the space where components of the image forming apparatus are arranged. When the exhaust fan 53 or the intake fan 54 is activated, minute dust, such as splashes of toner, adheres to the charging device 51 while being carried on the air currents, to thus deteriorate charging performance. A deterioration in charging performance results in an increase in the density of an image, which in turn induces inconsistencies in density.

FIG. 18 is a descriptive view showing a decrease in charging performance derived from such contamination of the charging device. FIG. 18(*a*) corresponds to FIG. 18(*a*). FIG. 18(*b*) is a characteristic chart showing time-varying changes caused by contamination of the charging device, wherein the degree of contamination is great in the direction of CH, and the degree of contamination is low in the direction of CL. Reference numeral 18 designates the height of an image. FIG. 18(*c*) is a characteristic chart showing time-varying changes in charging performance, wherein charging performance is high in the direction of DX, and charging performance is low in the direction of DL. Broken line Dx designates initial charging performance, and solid line Dy designates charging performance achieved with lapse of time. As shown in FIG. 18, the degree of contamination is high at downstream of the air currents circulating around the neighborhood of the charging device, and charging performance is deteriorated. Next, the reason for this will be described.

In FIG. 18(*a*), a fine powder 59, such as the toner having passed through a cleaner of the photoconductor 5, intrudes into the duct 52 provided as a measure against ozone while adhering to the photoconductor 5, and is conveyed downstream while being carried on the air current in the duct 52. When the fine powder in the duct 52 adheres to the charging device 51 to thus stain the same, charging performance drops. Especially, the density of contaminants is increased at the downstream end of the air currents, so that stains are likely to accumulate on the charging device 51. As shown in FIG. 18(*c*), comparison of the air currents blowing to the charging device 51 at a downstream position Aa with the air currents blowing to the charging device 51 at an upstream position Ab shows that time-varying drop in charging capability at the position Aa becomes greater.

The image forming apparatus of this type uses an optical scanning device having a rotary polygon mirror as an exposure device. JP-A-5-236214 (hereinafter referred to as JPA'214) describes an image forming apparatus equipped with such an optical scanning device. Specifically, JPA'214 describes a charging device and an optical scanning device having a rotary polygon mirror, such as those described by reference to FIGS. 17A and 18.

As described by reference to FIG. 18, in the image forming apparatus using a non-contact charging device, air currents are caused to circulate around the neighborhood of the charging device as a measure against ozone. However, stains on the charging device become irregular because of fine powder, such as toner mixedly present in the air currents. In an example shown in FIG. 18(*b*), the degree of contamination achieved at the downstream end of the air currents becomes greater. Thus, as a result of the degree of stains on the charging device becoming irregular, inconsistencies arise in the density of a printed image. In short, stains on the charging device result in a drop in charging performance; the density of a print tends to easily become higher; and charging performance achieved at the downstream end of the air currents is deteriorated. The image forming apparatus described in JPA'214 encounters a problem of the ability to address deterioration of image quality induced by a drop in charging performance.

Furthermore, in the field of an image forming apparatus such as a printer, a photoconductor having a photosensitive layer being formed on the surface thereof is used as a photoconductor. FIG. 19 is an explanatory view of an example where such a photosensitive layer is formed. As shown in FIG. 19, the photosensitive layer of a photoconductor 52 is formed by means of dipping (a dip-coating method) the photoconductor into a coating fluid contained in a container 56. In FIG. 19, the photoconductor 52 is gripped by means of a jig 51; dipped in a coating fluid as indicated by arrow X; and pulled, whereby a photosensitive layer 54 is formed on the surface of the photoconductor 52. In relation to the thus-formed photosensitive layer 54, a deviation of 1 to 2 μm arises between the film thickness of the photosensitive layer formed over an upper portion 53 of the photoconductor and the film thickness of the photosensitive layer formed over a lower portion 55 of the photoconductor, under the influence of an electric-charge generation layer and an electric-charge transport layer.

For instance, the photosensitive layer formed over the upper portion 53 of the photoconductor is smaller in film thickness than the photosensitive layer formed over the lower portion 55 of the photoconductor by an amount of 1 to 2 μm. The potential of the electric charges on the surface of the photoconductor is inversely proportional to the electrostatic capacitance of the photosensitive layer. Specifically, the charging potential of the surface of the photoconductor is proportional to the film thickness of the photosensitive layer. When the film thickness is large, the potential increases. Consequently, the distribution of sensitivity achieved during exposure varies in the axial direction of the photoconductor (in the longitudinal direction; namely, the main scanning direction).

FIG. 20 is a descriptive view showing a relationship between the distribution of an axial film thickness of the photoconductor 5 and the distribution of sensitivity of the same. FIG. 20(*c*) is a diagrammatic perspective view of the photoconductor 5; FIG. 20(*d*) is a front view of the same; and FIG. 20(*e*) is a side view of the same. FIG. 20(*a*) is a characteristic chart showing the distribution of film thickness, wherein the horizontal axis corresponds to axial positions of the photoconductor, and the vertical axis corresponds to film thickness. Reference symbol SH designates a direction in which a film thickness is high, and SL designates a direction in which a film thickness is low. FIG. 20(*b*) is a characteristic view of a sensitivity distribution, wherein the horizontal axis represents axial positions of the photoconductor and the vertical axis represents sensitivity. Reference symbol FH designates a direction in which sensitivity is high, and FL designates a direction in which sensitivity is low.

Reference symbol FX shown in FIG. 20(*b*) is an approximate straight line in the sensitivity distribution. Specifically, provided that a change in the sensitivity of the photoconductor 5 comes to approximate a straight line, sensitivity is understood to have a tendency of to become higher (or lower) from one axial end to the other axial end. In the example shown in FIG. 20(b), sensitivity is low at one end Aa within an image formation range A, and becomes higher at the other end Ab. The sensitivity distribution of the photoconductor affects inplane evenness of an image printed by a printer.

An optical scanning device having a rotary polygon mirror as an exposure device is used in the image forming apparatus of this type. JPA'214 describes an image forming apparatus equipped with such an optical scanning device.

As mentioned above, in an image forming apparatus using such a photoconductor, the axial film thickness of the photosensitive layer is changed by factors arising during processes for manufacturing the photoconductor, which in turn raises a problem of the distribution of sensitivity becoming uneven because of variations in the axial film thickness of a photosensitive layer. Therefore, the inplane unevenness in an image printed by a printer is impaired as a result of the distribution of sensitivity being made uneven, thereby raising a problem of occurrence of inconsistencies in the density of a printed image. However, the image forming apparatus described in JPA'214 raises a problem of a failure to address deterioration of image quality attributable to changes in the axial film thickness of the photosensitive layer of the photoconductor.

Furthermore, in the optical scanning device, dust or dirt in the air collides against and adheres to the reflection faces of the rotary polygon mirror with lapse of an operating time, thereby inducing stains. FIG. 21 is a descriptive view for describing a circumstance where the rotary polygon mirror 1 is stained.

As shown in FIG. 21, when a rotary polygon mirror 1 rotates in a direction designated by arrow Rb, the air existing around the polygon mirror flows in relation to respective reflection faces 2 in a direction opposite the rotating direction of the reflection faces, to thus generate air currents 4. The air currents 4 induce air turbulence at a position downstream of a boundary edge section 3 between adjacent reflection faces 2, 2. As a result of occurrence of such air turbulence, the dust or dirt particles contained in the air currents 4 become entangled in the air turbulence and collide against the respective reflection faces 2. Therefore, in each reflection face 2 of the rotary polygon mirror 1, an area 2' located downstream of and close to the boundary edge section 3 (i.e., a front end of the reflection face 2 in the rotating direction thereof) is chiefly, noticeably stained. Staining of the area 2' located downstream of and close to the boundary edge 3 signifies that an area located upstream of a deflected light beam; i.e., staining occurs in an area located close to a start point from which writing is started by the light beam (hereinafter called a "write start point") in the main scanning direction. During the course of continued use of the laser printer, optical power of the light beam spot acquired at the write start point is decreased.

FIG. 22 is a characteristic view showing characteristics of a decrease in the quantity of reflected light induced by stains on the reflection faces of the rotary polygon mirror. The horizontal axis in FIG. 22 represents positions on the reflection face, where a write start position is designated by 0 and a write end position is designated by 1. Further, the vertical axis represents a relative quantity of reflected light, where 1 designates a normal value. As shown in FIG. 22, the quantity of light reflected from the respective stained reflection faces 2 of the rotary polygon mirror 1 that has operated for a given period of time is understood to decrease dependent on positions on the reflection faces of the rotary polygon mirror. Measurement was performed at the same incident angle.

FIG. 23 is a descriptive view showing an example of changes in the distribution of light quantity caused by a scanning direction of a light beam; i.e., a rotating direction of the polygon mirror, and time-varying stains on the deflective reflection faces. FIG. 23(a) is a characteristic chart showing the distribution of light quantity, wherein the horizontal axis represents positions of the photoconductor; reference symbol A designates a range where an image is formed; Ax designates a write start side; and Ay designates a write end side. The vertical axis represents the distribution of light quantity; reference symbol VH designates a direction in which the quantity of light is high; and VL designates a direction in which the quantity of light is low. Reference symbol Va designates a characteristic of the distribution of initial light quantity, and Vb designates a characteristic of the distribution of light quantity achieved after lapse of time. The rotary polygon mirror 1 rotates in the direction of arrow Ra, and a scanning optical system 13 causes the light beam to scan in the direction of arrow D. An image is formed within the range A on a scan face 14 of the photoconductor, and the distribution of light quantity decreases with lapse of time. The drop in the distribution of light quantity achieved at the write start side Ax is greater than that achieved at the write end side Ay.

As mentioned above, when the rotary polygon mirror is continuously used, stains arise on the reflection faces of the rotary polygon mirror. Reflectivity is decreased by the stains, and the optical power of the optical beam spot on the scan face is decreased. The stains on the reflection faces become uneven within the respective reflection faces, and hence the distribution of optical power in the main scanning direction on the scan face also becomes uneven.

When an image forming apparatus using such an optical scanning device; for instance, an electrophotographic laser printer, is continuously used, there arises a problem of inconsistencies arising in the density or color of an image for reasons of unevenness in the distribution of light power. Specifically, the image forming apparatus using a rotary polygon mirror encounters a problem which is caused by optical changes or time-varying changes in the intensity of light in the main scanning direction. However, the image forming apparatus defined in JPA'214 encounters a problem of a failure to address deterioration of image quality, which is caused by optical changes or time-varying changes in the intensity of light in the main scanning direction.

SUMMARY OF THE INVENTION

The present invention has been conceived in view of a drawback in the related art, and a first object of the invention is to provide an image forming apparatus which prevents deterioration of image quality, which would otherwise be caused by a drop in the quantity of light attributable to stains on a beam exit window.

A second object of the invention is to provide an image forming apparatus which prevents deterioration of image quality, which would otherwise be caused by a drop in charging performance attributable to stains on an charging device.

A third object of the invention is to provide an image forming apparatus which is configured so as to prevent deterioration of image quality by addressing time-varying changes in the distribution of light of an optical system used in an exposure device.

A fourth object of the invention is to provide an image forming apparatus which prevents deterioration of image quality by means of addressing unevenness in sensitivity attributable to variations in the axial film thickness of a photoconductor.

The at least one of the above objects is achieved by an embodiment described below:

(1). An image forming apparatus comprising:
a photoconductor, adapted such that an electrostatic latent image is formed thereon and extending in a first direction; and
an optical scanner, operable to emit a light beam to expose the photoconductor while scanning in the first direction, wherein:
the photoconductor and the optical scanner define a space therebetween; and
the space allows air to flow therethrough in the first direction.

(2). The image forming apparatus according to (1), further comprising:
a charging device, operable to charge the photo conductor;
a developer, adapted to develop the latent image as a visible toner image; and
a transfer device, adapted to transfer the toner image on a transfer medium.

(3). An image forming apparatus comprising:
a photoconductor, adapted such that an electrostatic latent image is formed thereon and extending in a first direction; and
an optical scanner, operable to emit an light beam to expose the photoconductor while scanning, wherein:
the photoconductor and the optical scanner define a space therebetween;
the space allows air to flow therethrough in the first direction; and
the optical scanner is arranged such that a light quantity distribution thereof increases in the first direction.

(4). The image forming apparatus according to (3), further comprising:
a charging device, operable to charge the photo conductor;
a developer, adapted to develop the latent image as a visible toner image; and
a transfer device, adapted to transfer the toner image on a transfer medium.

(5). The image forming apparatus according to (3), wherein the optical scanner comprises a rotary polygon mirror adapted to scan the photoconductor with a polarized light beam reflected thereby.

(6). The image forming apparatus according to (3), wherein the optical scanner comprises:
a light source, operable to emit the light beam from an upstream side in the first direction;
a rotary polygon mirror, adapted to reflect the light beam toward the photoconductor; and
the light beam is an S-polarized light beam.

(7). The image forming apparatus according to (3), wherein the optical scanner comprises:
a light source, operable to emit the light beam from a downstream side in the first direction;
a rotary polygon mirror, adapted to reflect the light beam toward the photoconductor; and
the light beam is a P-polarized light beam.

(8). An image forming apparatus comprising:
a photoconductor, adapted such that an electrostatic latent image is formed thereon and extending in a first direction; and
an optical scanner, operable to expose the photoconductor while scanning; wherein
the photoconductor and the optical scanner define a space therebetween;
the space allows air to flow therethrough in the first direction; and
the photoconductor is arranged such that a sensitivity distribution increases in the first direction.

(9). The image forming apparatus according to (8), further comprising:
a charging device, operable to charge the photo conductor;
a developer, adapted to develop the latent image as a visible toner image; and
a transfer device, adapted to transfer the toner image on a transfer medium.

(10). The image forming apparatus according to (8), wherein the photoconductor has a photoconductive layer; and a thickness of the photoconductive layer increases in the first direction.

(11). The image forming apparatus according to (8), further comprising a fan, disposed at a downstream side in the first direction and operable to allow the air to flow from the space to an outside of the space.

(12). The image forming apparatus according to (8), further comprising a fan, disposed at an upstream side in the first direction and operable to allow the air to flow from an outside of the space to the space.

(13). An image forming apparatus comprising:
a photoconductor, adapted such that an electrostatic latent image is formed thereon and extending in a first direction;
an optical scanner, operable to expose the photoconductor while scanning in the first direction; and
a charging device, operable to charge the photoconductor and disposed in a space, wherein
the space allows air to flow therethrough in a second direction opposite to the first direction.

(14). The image forming apparatus according to (13), further comprising:
a developer, adapted to develop the latent image as a visible toner image; and
a transfer device, adapted to transfer the toner image on a transfer medium.

(15). An image forming apparatus comprising:
a photoconductor, adapted such that an electrostatic latent image is formed thereon and extending in a first direction;
an optical scanner, operable to expose the photoconductor while scanning; and
a charging device, operable to charge the photoconductor and disposed in a space, wherein:
the space allows air to flow therethrough in the first direction; and
the optical scanner is arranged such that a light quantity distribution decreases in the first direction.

(16). The image forming apparatus according to (15), further comprising:
a developer, adapted to develop the latent image as a visible toner image; and
a transfer device, adapted to transfer the toner image on a transfer medium.

(17). The image forming apparatus according to (15), wherein the optical scanner comprises a rotary polygon mirror adapted to scan the photoconductor with a polarized light beam reflected thereby.

(18). The image forming apparatus according to (15), wherein the optical scanner comprises:
a light source, operable to emit the light beam from a downstream side in the first direction;
a rotary polygon mirror, adapted to reflect the light beam toward the photoconductor; and the light beam is an S-polarized light beam.

(19). The image forming apparatus according to (15), wherein the optical scanner comprises:
a light source, operable to emit the light beam from an upstream side in the first direction;
a rotary polygon mirror, adapted to reflect the light beam toward the photoconductor; and
the light beam is a P-polarized light beam.

(20). An image forming apparatus comprising:
a photoconductor, adapted such that an electrostatic latent image is formed thereon and extending in a first direction; and
an optical scanner, adapted to expose the photoconductor while scanning in the first direction,
wherein the photoconductor is arranged such that a sensitivity distribution of the photoconductor decreases in the first direction.

(21). The image forming apparatus according to (20), further comprising:
a charging device, operable to charge the photo conductor;
a developer, adapted to develop the latent image as a visible toner image; and
a transfer device, adapted to transfer the toner image on a transfer medium.

(22). The image forming apparatus according to (20), wherein the photoconductor has a photoconductive layer; and a thickness of the photoconductive layer decreases in the first direction.

(23). An image forming apparatus comprising:
a photoconductor, adapted such that an electrostatic latent image is formed thereon and extending in a first direction; and
an optical scanner, operable to expose the photoconductor while scanning,
wherein the optical scanner and the photoconductor are arranged such that a sensitivity distribution of the photoconductor decreases and a light quantity distribution of the optical scanner increases respectively in the first direction.

(24). The image forming apparatus according to (23), wherein the optical scanner comprises:
a light source, operable to emit the light beam from an upstream side in the first direction;
a rotary polygon mirror, adapted to reflect the light beam toward the photoconductor; and
the light beam is an S-polarized light beam.

(25). The image forming apparatus according to (23), wherein the optical scanner comprises:
a light source, operable to emit the light beam from a downstream side in the first direction;
a rotary polygon mirror, adapted to reflect the light beam toward the photoconductor; and
the light beam is a P-polarized light beam.

(26). The image forming apparatus according to (23), wherein the photoconductor has a photoconductive layer; and a thickness of the photoconductive layer decreases in the first direction.

(27). The image forming apparatus according to (24), wherein the photoconductor has a photoconductive layer; and a thickness of the photoconductive layer decreases in the first direction.

(28). The image forming apparatus according to (25), wherein the photoconductor has a photoconductive layer; and a thickness of the photoconductive layer decreases in the first direction.

DETAILED DESCRIPTION OF THE INVENTION

An image forming apparatus according to a first embodiment of the present invention will be described hereinbelow. In an image forming apparatus, such as a printer, to which the present invention is applied, an optical scanning device having a rotary polygon mirror is used as an exposure device. In the optical scanning device, dust or dirt in the air collides against and adheres to the reflection face of the rotary polygon mirror with lapse of an operating time, thereby inducing stains as described above with reference to FIG. 21.

Figure 1:
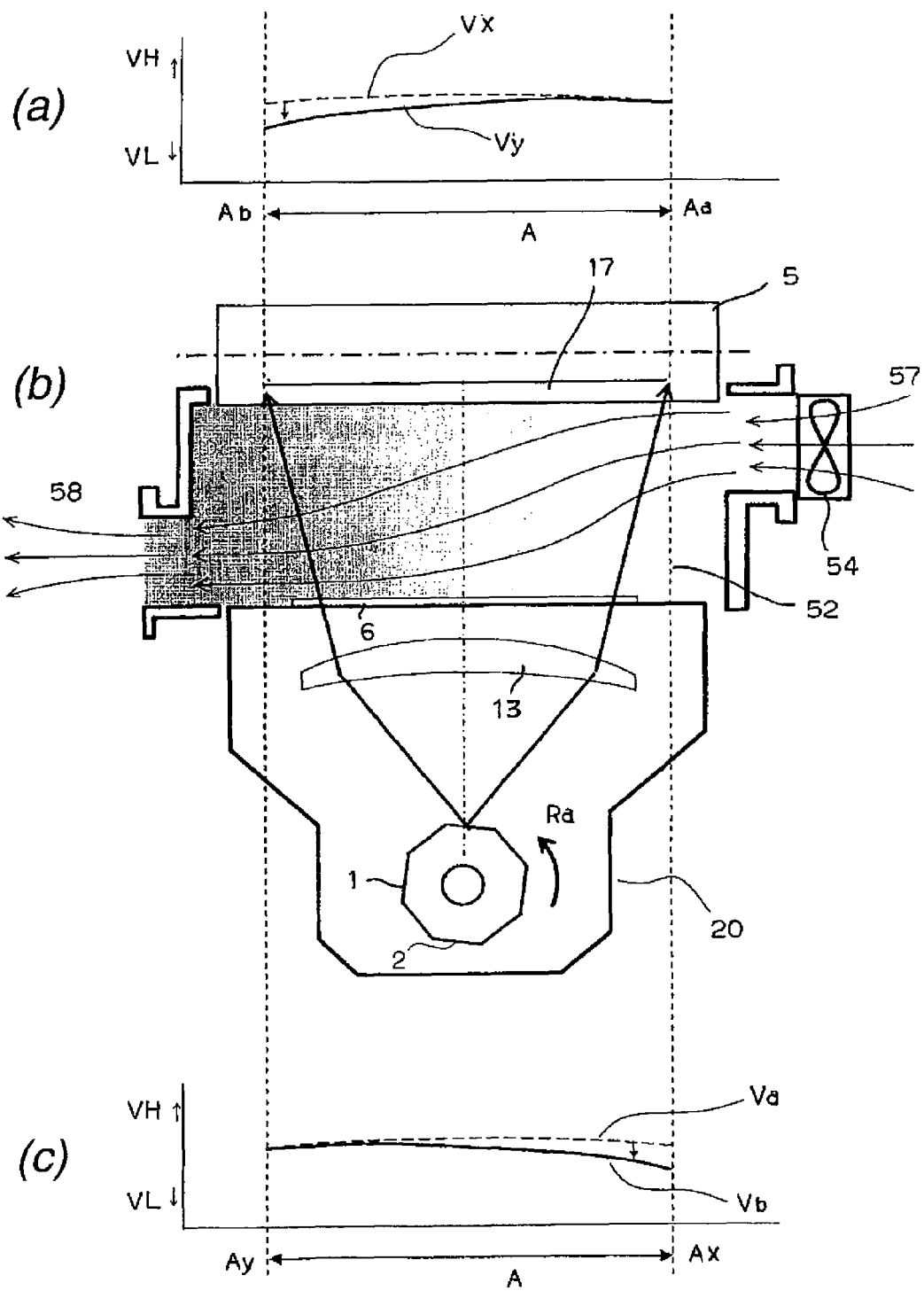
FIG. 1 is a descriptive view showing a first embodiment of the present invention.
Figure 15A:
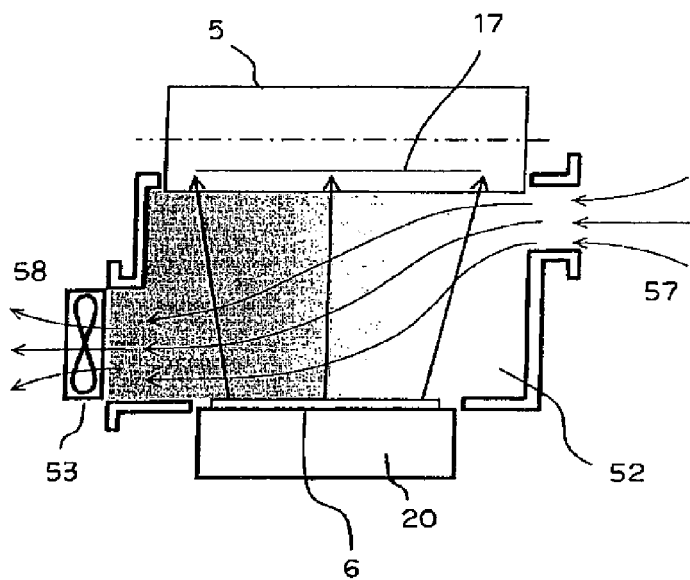
FIGS. 15A to 15C are descriptive views each showing an example layout of the optical scanning device.
Figure 15B:
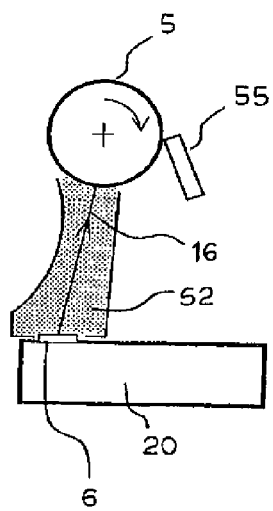

In the first embodiment of the present invention, attention is paid to the characteristic of a drop in the quantity of reflected light caused by the stains on the reflection faces of the rotary polygon mirror as described by reference to FIG. 21, and the drop in the quantity of light caused by stains on the beam exit window is canceled by the characteristic of the drop in the quantity of reflected light. The first embodiment of the present invention will be described by reference to the descriptive view shown in FIG. 1. FIG. 1(b) is a view showing the layout of the beam exit window 6 of the optical scanning device 20 corresponding to the axial layout of the photo conductor 5. The FIG. 1(b) corresponds to FIG. 15A and FIG. 16(a). FIG. 1(a) corresponds to the characteristic of the distribution of light quantity caused by stains on the beam exit window shown in FIG. 16(c). FIG. 1(c) shows the characteristic of the distribution of the quantity of reflected light caused by stains on the reflected faces of the rotary polygon mirror, which is shown in FIG. 23(a).

As mentioned above, the characteristic chart showing time-varying changes in the quantity of light derived from stain of the beam exit window 6 shown in FIG. 1(a) is related to the distribution of reflected light quantity caused by stains on the reflection faces of the rotary polygon mirror shown in FIG. 1(c). Specifically, the photo conductor 5 is arranged such that the downstream (Ab) 58 of the air currents, where the quantity of light is decreased by the strains on the beam exit window 6, comes to the side Ay where a decrease in the quantity of reflected light caused by the time-varying stains on the polygon mirror is low. The photo conductor 5 is arranged such that the upstream side (Aa) 57 of the air currents, where the quantity of light is not decreased by the strains on the beam exit window 6, comes to the side Ax where the distribution of the quantity of reflected light is low.

By means of such a relationship between the direction of the air currents with respect to the beam exit window 6 and the write start side of the rotary polygon mirror, the drop in light quantity caused by time-varying stains on the beam exit window 6 is canceled by the distribution of the quantity of light reflected from the rotary polygon mirror, to thus make uniform the quantity of light emitted to the photo conductor 5. Accordingly, occurrence of inconsistencies in density and color is eliminated, so that deterioration of print image quality can be prevented.

Specifically, the image forming apparatus according to the first embodiment of the present invention is an image forming apparatus which is provided with at least one image forming station, where charging means, exposure means using an optical scanning device having a rotary polygon mirror, development means, and transfer means are disposed around a photo conductor, and which transfers a toner image formed by the image forming station onto a transfer medium, wherein the air currents 57, 58 in a space, through which passes a light beam emitted from the beam exit window 6 of the optical scanning device 20 toward the photo conductor 5, flow in an axial direction of the photo conductor 5; and a flowing direction of the air currents and a direction of optical scan performed by the rotary polygon mirror 1 are identical with each other.

In this image forming apparatus, the optical scanning device 20 and the photo conductor 5 are desirably arranged such that an upstream of the air currents comes to a start point of a beam spot which is emitted from the optical scanning device 20 and scanned over the photo conductor 5.

The first embodiment of the present invention can provide an image forming apparatus wherein a layout is made such that the distribution of light quantity caused by stains on the beam exit window of the optical scanning device and the distribution of light quantity caused by stains on the reflection face of the rotary polygon mirror disposed in the optical scanning device cancel each other, thereby lessening inconsistencies in the density of a printed image.

An image forming apparatus according to a second embodiment of the present invention will be described hereinbelow.

Figure 21:
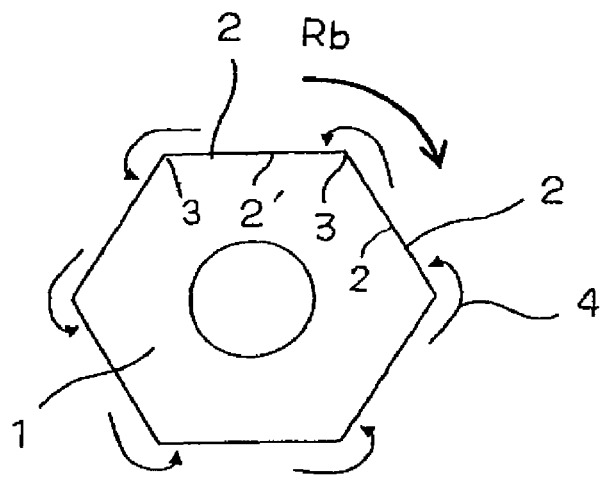
FIG. 21 is a descriptive view showing example stains on a rotary polygon mirror.
Figure 22:
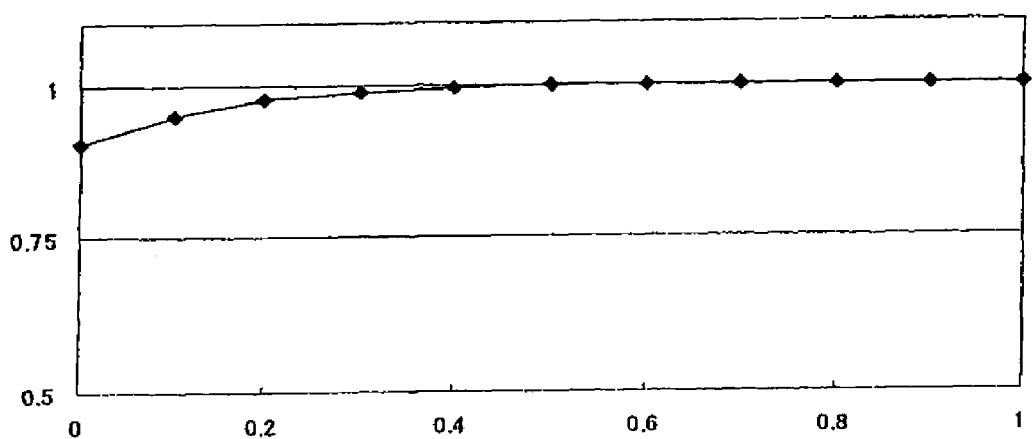
FIG. 22 is a characteristic chart showing a drop in the quantity of reflected light.

An optical scanning device used by the image forming apparatus of the present invention has a rotary polygon mirror as shown in FIG. 21. In this rotary polygon mirror, the distribution of light quantity in the direction of optical scan over a photoconductor; namely, the direction of air currents circulating around an charging device, is deteriorated with lapse of operating time for reasons of stains on deflection faces. The second embodiment is basically configured to cancel inconsistencies in the density of an image stemming from a drop in charging capability, by means of utilizing such a characteristic of the distribution of light quantity becoming non-uniform with reference to the direction of air currents.

Figure 23:
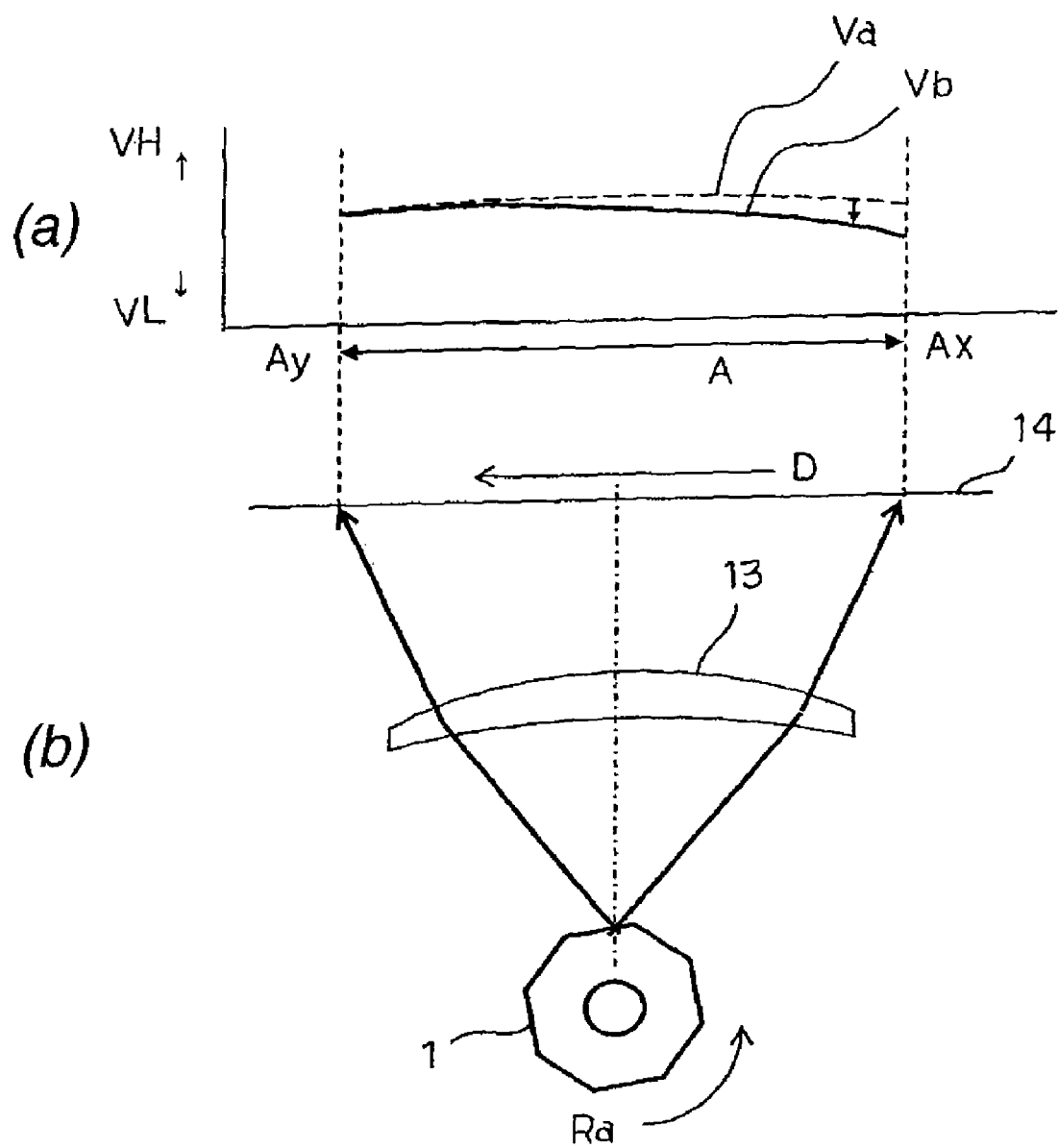
FIG. 23 is a characteristic chart showing a drop in the time-varying quantity of light of an optical scanning device.

In FIG. 23, the main scanning direction of the photoconductor corresponds to the circulating direction of air currents around the charging device. Consequently, the characteristic of distribution of light quantity achieved in the main scanning direction of the photoconductor, such as that shown in FIG. 23, corresponds to the distribution of light quantity achieved in the circulating direction of air currents around the charging device. Specifically, the characteristic of distribution of light quantity achieved in the main scanning direction of the photoconductor shown in FIG. 23(a) can be replaced with the distribution of light quantity in the circulating direction of air currents around the charging device.

In the second embodiment of the present invention, inconsistencies in the density of an image are canceled by use of a characteristic of the distribution of light quantity achieved in the circulating direction of the air currents around the charging device. In an example shown in FIG. 23, in connection with a relationship between the air currents circulating around the charging device and the distribution of light quantity, the downstream side of the air currents corresponds to the write start side, and the upstream side of the air currents corresponds to the write end. Consequently, the charging capability achieved at the downstream of air currents decreases, and the distribution of light quantity is made low at the side where the density of an image becomes high, thereby canceling occurrence of inconsistencies in an image.

Figure 2:
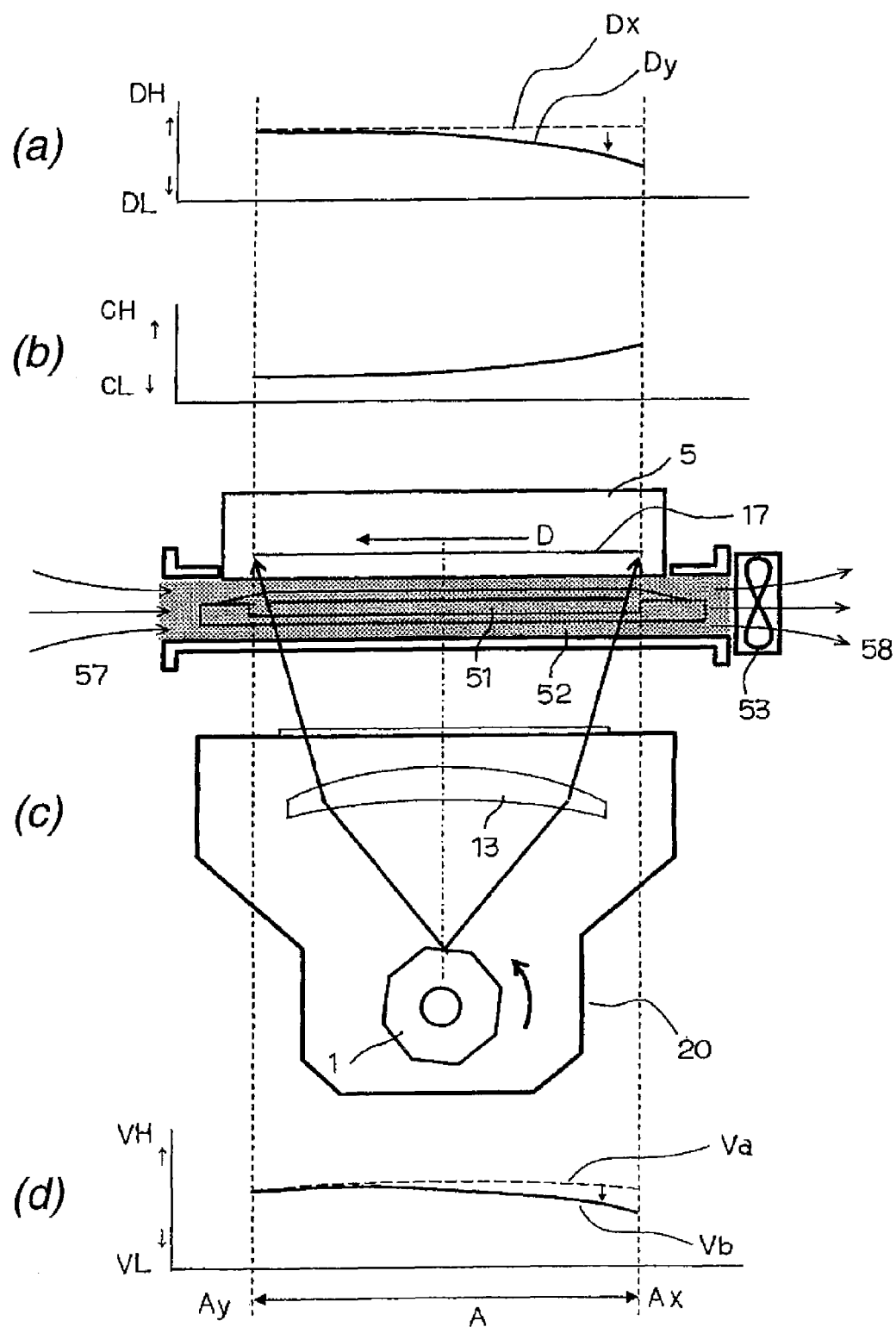
FIG. 2 is a descriptive view showing a second embodiment of the present invention.
Figure 18:
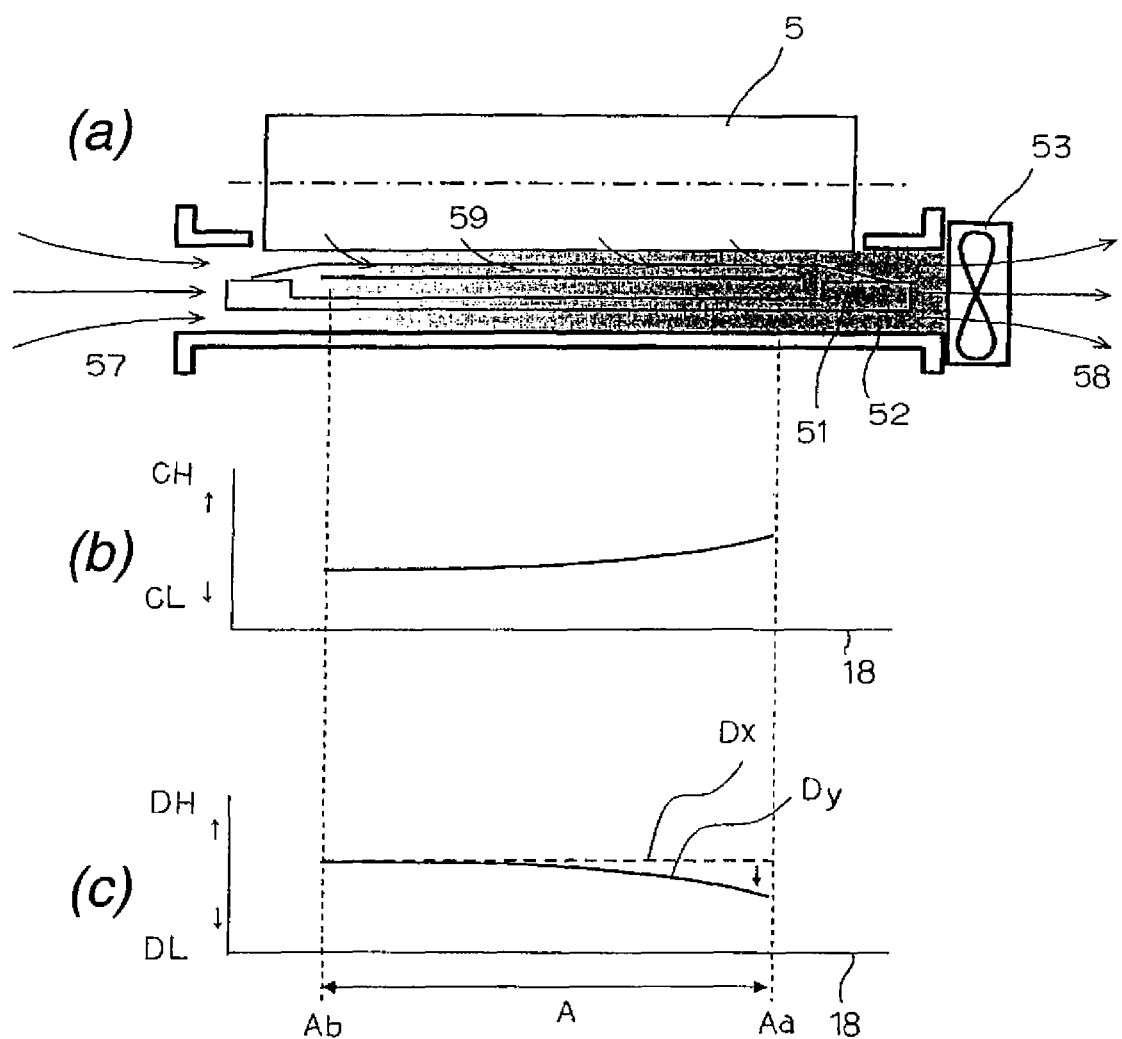
FIG. 18 is an explanatory view showing a relation between the degree of strain achieved in the direction of air currents of the charging device and the charging capacity.
Figure 19:
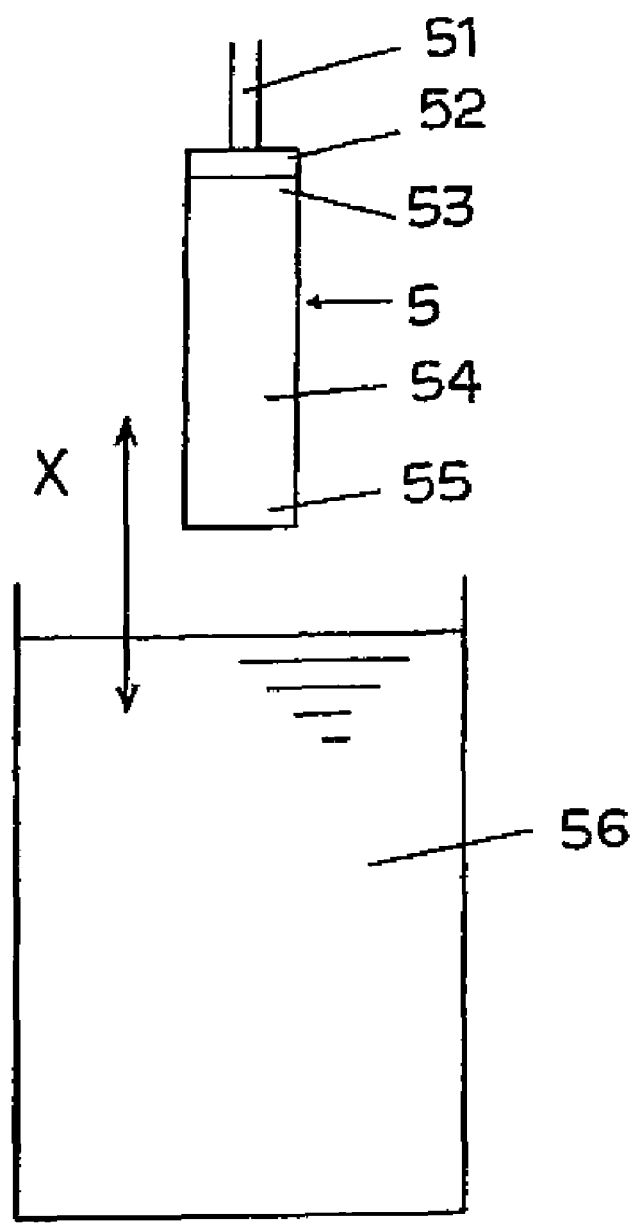
FIG. 19 is an explanatory view showing an example in which a photosensitive layer is formed on the photo conductor.

FIG. 2 is a descriptive view showing the second embodiment of the present invention. A positional relationship between a photoconductor 5 and an charging device 51 corresponds to FIG. 18(a), and an exhaust fan 53 is provided around the charging device 51 for the purpose of circulating air currents. Reference symbol D denotes a scanning direction of a scanning line 17 on the photoconductor 5. FIG. 2(a) corresponds to the characteristic chart of charging capability shown in FIG. 18(c). FIG. 2(b) corresponds to the characteristic chart of the degree of staining of the charging device shown in FIG. 18(b). FIG. 2(d) corresponds to a characteristic chart of the distribution of light quantity shown in FIG. 23(a).

In the embodiment shown in FIG. 2, the optical device is arranged such that the write start side Ax relative to the photoconductor 5 becomes a downstream side of air currents where a drop arises in charging capability and such that the write end side Ay becomes an upstream side of air currents. By means of such a configuration, the tendency of the charging capability decreasing at the downstream of the air currents to thus make the density of an image high is canceled by the characteristic of the distribution of light quantity becoming small, thereby suppressing inconsistencies in the density of an image.

Specifically, the image forming apparatus of the present second embodiment is characterized in that air currents existing around the charging device flow in an axial direction of the photoconductor; the optical scanning device deflects light with a rotary polygon mirror, to thus effect an optical scan; and a flowing direction of the air currents around the charging device is opposite an optical scanning direction. As mentioned above, inconsistencies in the density of an image caused by a drop in charging capability are canceled by utilization of a characteristic of time-varying deterioration of the distribution of light quantity caused by stains on the rotary polygon mirror. Since special components or control for preventing deterioration of image quality, which would otherwise be caused by a drop in charging capability, are not necessary, print quality can be enhanced in a simple manner and at low cost.

Specifically the image forming apparatus of the second embodiment of the present invention is an image forming apparatus which is provided with at least one image forming station, where an charging device, exposure means using an optical scanning device, development means, and transfer means are disposed around a photoconductor, and which transfers onto a transfer medium a toner image formed by the image forming station, wherein air currents present around the charging device flow in an axial direction of the photoconductor; the optical scanning device deflects light with a rotary polygon mirror, to thus effect an optical scan; and a flowing direction of the air currents around the charging device is opposite to an optical scanning direction. In the image forming apparatus of the present invention, the optical scanning device is desirably arranged such that a downstream side of the air currents becomes a write start side at the time of scanning of the photoconductor.

In the image forming apparatus of the second embodiment of the present invention, an intermediate transfer medium is desirably used as the transfer medium.

The second embodiment provides a configuration where the flowing direction of air currents achieved around an charging device is opposite to an optical scanning direction. By means of such a configuration, there can be provided an image forming apparatus which cancels the tendency of the charging performance of the charging device becoming deteriorated by fine powder to thus make the density of an image high, by utilization of a characteristic of the distribution of light quantity becoming smaller as a result of time-varying deterioration of a rotary polygon mirror, thereby lessening inconsistencies in the density of a printed image and preventing deterioration of image quality.

Figure 3:
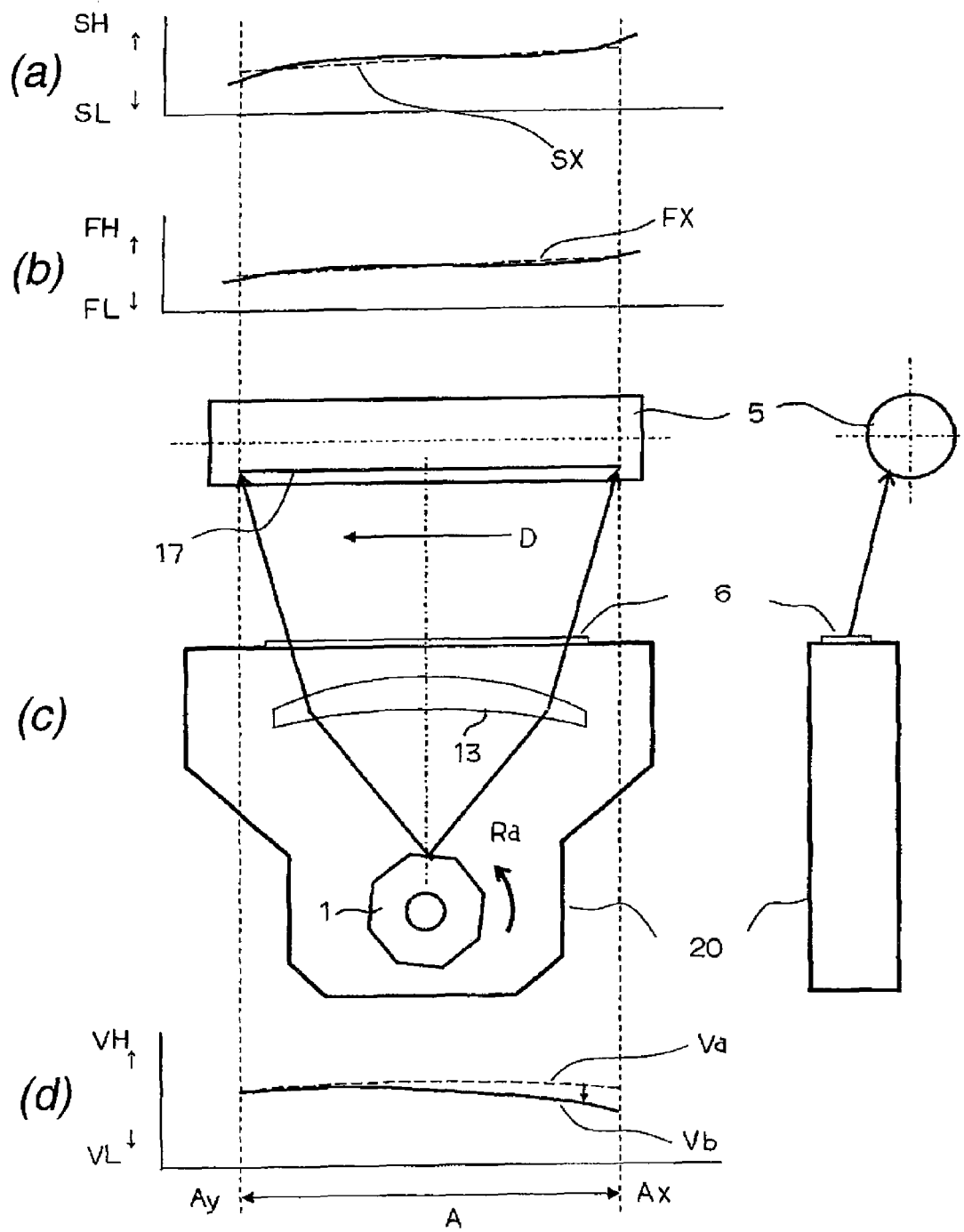
FIG. 3 is a descriptive view showing a third embodiment of the present invention.

FIG. 3 is a descriptive view showing a third embodiment of the present invention. In FIG. 3, a rotary polygon mirror 1 rotates in the direction of arrow Ra. Reference numeral 5 designates a photoconductor; 6 designates a beam exit window; 13 designates a scanning optical system; 17 designates a scanning line; 20 designates an optical scanning device; and reference symbol A designates an image formation range. FIG. 3(d) is a characteristic chart showing a relationship between the distribution of light quantity and the axial position of the photoconductor, as described by reference to FIG. 23. In the third embodiment shown in FIG. 3, the distribution of light quantity is low at a write start side Ax of the image formation range, and the distribution of light quantity is high at a write end side Ay. Specifically, the distribution of light quantity achieved in the main scanning direction of the photoconductor is low at one end (the write start side Ax) and becomes high at the other end (the write end side Ay).

Figure 20:
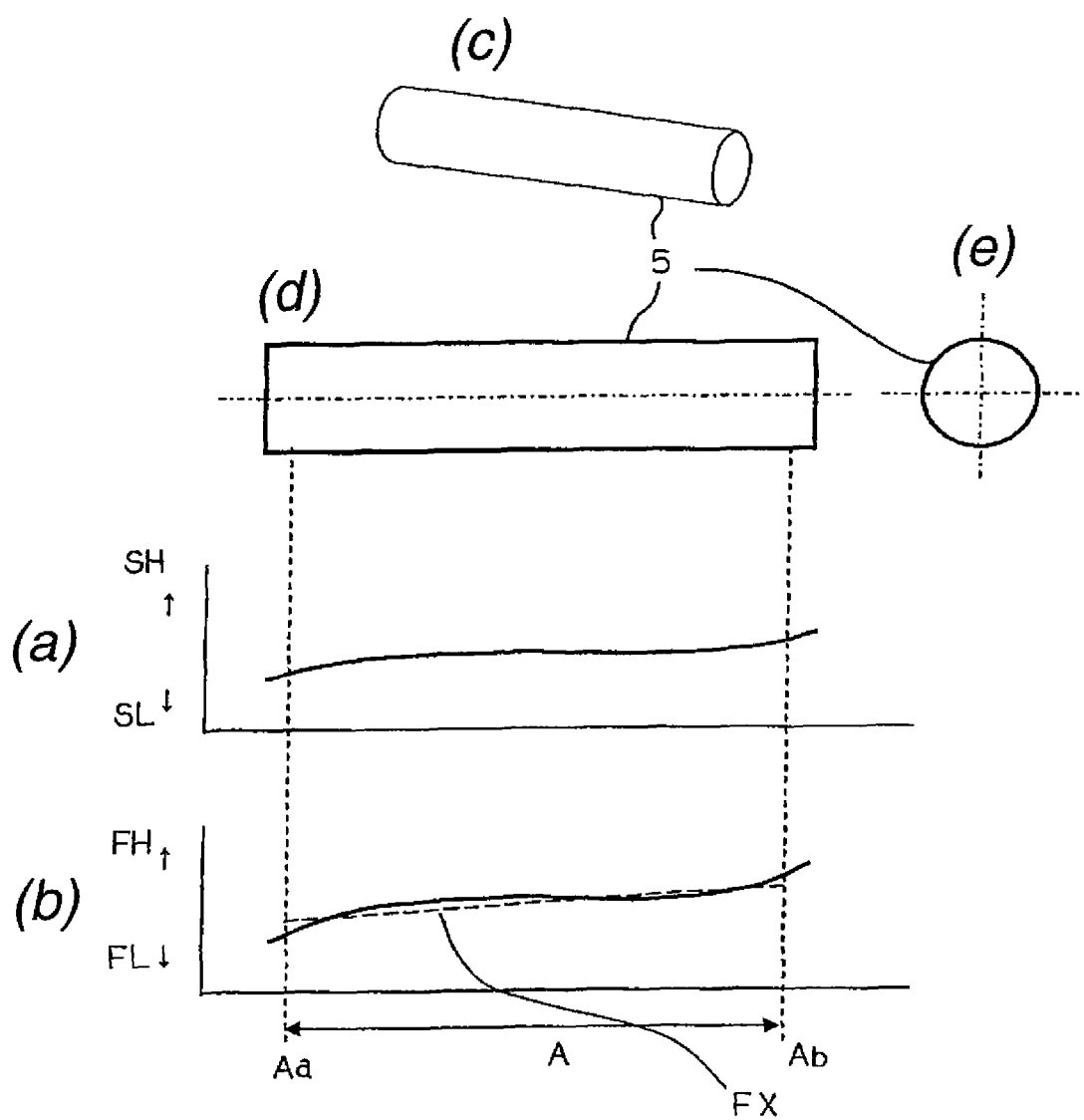
FIG. 20 is an explanatory view showing a relation between the distribution of the film thickness and the distribution of the sensitivity.

As shown in FIG. 3, in the optical scanning device according to the third embodiment of the present invention, the layout of a scanning optical system is set such that the distribution of light quantity achieved in the main scanning direction of the photoconductor is low at one end (the write start side Ax) and becomes higher at the other end (the write end side Ay). As mentioned above, the distribution of light quantity of the scanning optical system varies from the write start side of the beam spot from the write end side of the same, in terms of intensity, for reasons of time-varying changes. In the third embodiment of the present invention, attention is paid to the characteristic of the distribution of light quantity of such a scanning optical system, and the optical scanning device and the photoconductor are arranged in consideration of an uneven characteristic of the distribution of axial film thickness of the photoconductor and an uneven characteristic of the distribution of sensitivity, such as those described by reference to FIG. 20. Thus, inconsistencies in the density of a printed image are suppressed, and image quality is enhanced.

More specifically, the optical scanning device and the photoconductor are arranged such that a high-sensitivity portion of a distribution of axial sensitivity of the photoconductor comes to a write start side of a beam spot which is emitted from the optical scanning device to scan over the photoconductor. Moreover, the optical scanning device and the photoconductor are arranged such that a large-film-thickness portion of a distribution of axial film thickness of the photoconductor comes to a write start side of a beam spot which is emitted from the optical scanning device to scan over the photoconductor. Thus, the optical scanning device is arranged in accordance with the previously-measured distribution of axial film thickness of the photoconductor, thereby preventing deterioration of image quality. Therefore, since special components or control for preventing deterioration of image quality are not necessary, print quality can be enhanced readily and at low cost.

Specifically, the image forming apparatus of the third embodiment of the present invention is an image forming apparatus which is provided with at least one image forming station, where charging means, exposure means using an optical scanning device, development means, and transfer means are disposed around a photoconductor, and which transfers onto a transfer medium a toner image formed by the image forming station, wherein the optical scanning device and the photoconductor are arranged such that a high-sensitivity portion of a distribution of axial sensitivity of the photoconductor comes to a write start side of a beam spot which is emitted from the optical scanning device to scan over the photoconductor. In the image forming apparatus, the optical scanning device preferably has a rotary polygon mirror, and scanning with a light beam effected by this rotary polygon mirror preferably compensates for the distribution of sensitivity of the photoconductor.

Another image forming apparatus of the third embodiment of the present invention is an image forming apparatus which is provided with at least one image forming station, where charging means, exposure means using an optical scanning device, development means, and transfer means are disposed around a photoconductor, and which transfers onto a transfer medium a toner image formed by the image forming station, wherein the optical scanning device and the photoconductor are arranged such that a large-film-thickness portion of a distribution of axial film thickness of the photoconductor comes to a write start side of a beam spot which is emitted from the optical scanning device to scan over the photoconductor. In this image forming apparatus, the optical scanning device preferably has a rotary polygon mirror, and preferably compensates for inplane unevenness in a printed image, which is caused by a deviation in a film thickness of the photoconductor, by means of scanning with a light beam performed by the rotary polygon mirror.

Specifically, in the optical scanning device mounted on the image forming apparatus of the third embodiment of the present invention, the quantity of light achieved at the write start side tends to decrease with lapse of time for reasons of stains on the optical scanning device. In the third embodiment of the present invention, deterioration of image quality can be prevented by means of arranging the optical scanning device and the photoconductor such that a high-sensitivity portion of a distribution of axial sensitivity of the photoconductor comes to a write start side of a beam spot which is emitted from the optical scanning device to scan over the photoconductor. Further, the optical scanning device and the photoconductor are arranged such that a large-film-thickness portion of a distribution of axial film thickness of the photoconductor comes to the write start side of a beam spot, thereby preventing deterioration of image quality.

Figure 8:
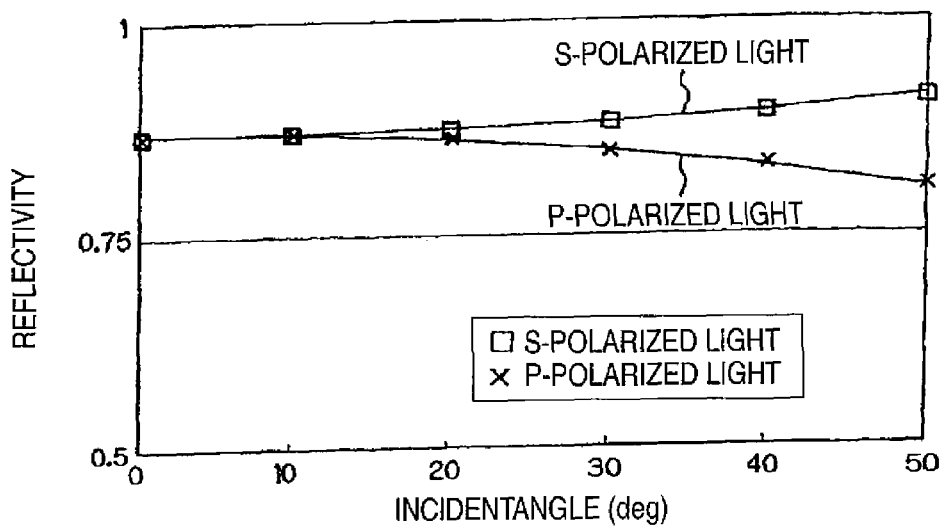
FIG. 8 is a characteristic view showing reflectivities of S-polarized light and P-polarized light.

An image forming apparatus according to a fourth embodiment of the present invention will be described hereinbelow. In an image forming apparatus, such as a printer, to which the present invention is applied, an optical scanning device has a rotary polygon mirror. A light beam entering the rotary polygon mirror is split into S-polarized light and P-polarized light, which cross each other at right angles. FIG. 8 is a characteristic chart showing a relationship between the reflectivity achieved with respect to an incident angle of S-polarized light and the reflectivity achieved with respect to an incident angle of P-polarized light. A horizontal axis shown in FIG. 8 represents an incident angle on a rotary polygon mirror, and a vertical axis represents reflectivity. Reflection faces of a rotary polygon mirror are coated with a protective film.

As shown in FIG. 8, in this case, when S-polarized light enters, the reflectivity increases as the incident angle of the S-polarized light increases (i.e., an angle made with respect to the normal). In contrast, in the case of P-polarized light, the reflectivity decreases with an increase in the incident angle of the P-polarized light. Specifically, when S-polarized light enters, the quantity of light becomes lower at the incident light side with respect to the optical axis of the scanning optical system. In the case of P-polarized light, the quantity of light becomes higher at the incident light side with respect to the optical axis of the scanning optical system. These tendencies also apply to a case where reflection faces are formed from metal reflection mirrors which are not coated with a protective film.

In the fourth embodiment of the present invention, a drop in light quantity attributable to stains on the beam exit window is prevented in consideration of the characteristic of the distribution of quantity of S-polarized light and the characteristic of the distribution of quantity of P-polarized light, both of which enter such a rotary polygon mirror, and the arrangement of the optical scanning device in relation to the direction of air currents, to thus inhibit occurrence of inconsistencies in the density of a printed image.

Figure 6:
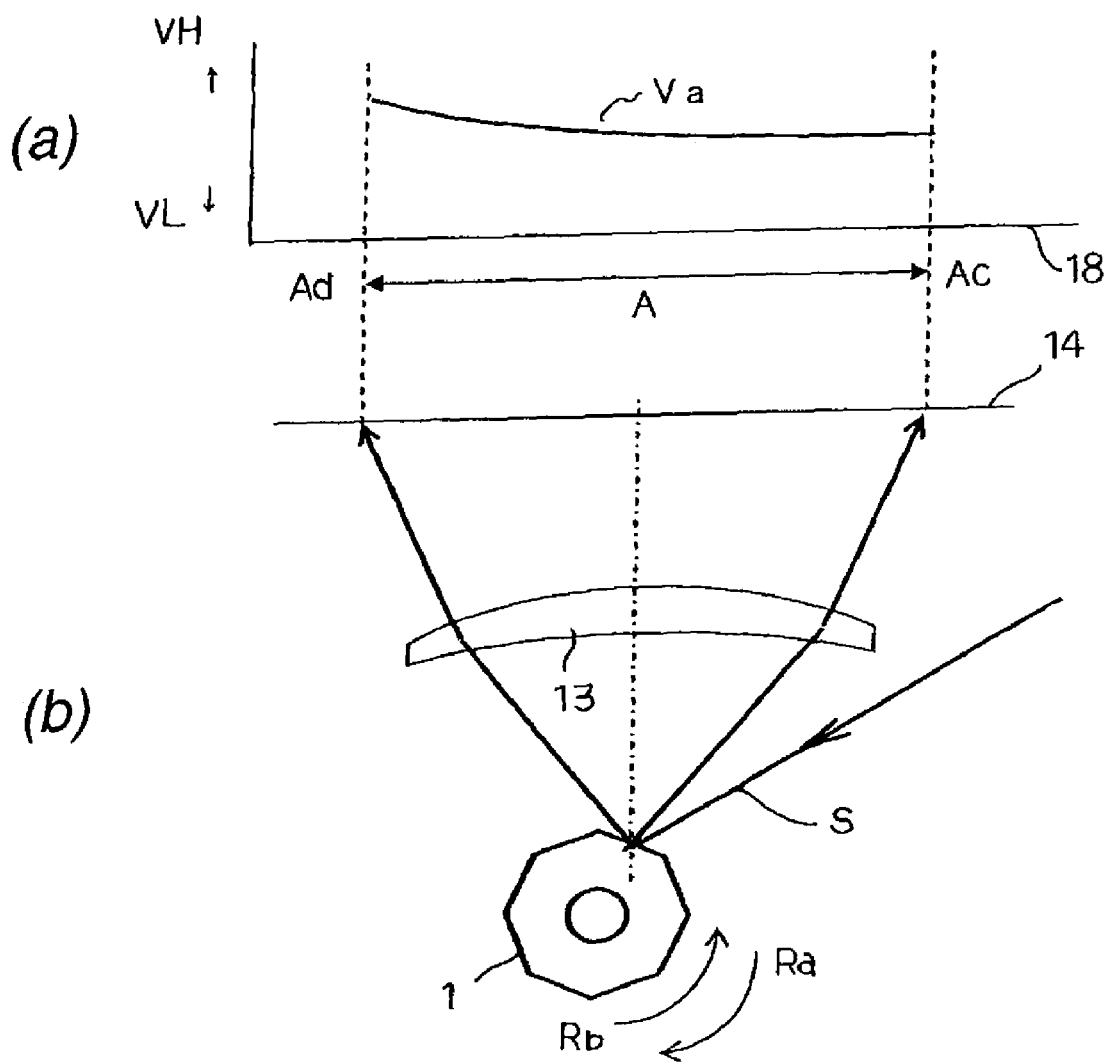
FIG. 6 is an explanatory view showing an example in which S-polarized light is incident.

FIG. 6 is a descriptive view showing an example layout of an optical system and an example distribution of light quantity, both of which pertain to the S-polarized incident light. In FIG. 6, a rotary polygon mirror 1 rotates in the direction of arrow Ra or Rb. Reference numeral 13 designates a scanning optical system; 14 designates a scan face; 18 designates the height of an image; and reference symbol A designates the range where an image is to be formed (hereinafter called an "image forming range") on a photoconductor. FIG. 6(a) is a characteristic chart showing a relationship between the distribution of light quantity Va and axial positions on the photoconductor. In the embodiment shown in FIG. 6, light quantity exhibits a low distribution at Ac, which is an incident light side of the image forming range A. Light quantity exhibits a high distribution at Ad. Specifically, the distribution of light quantity of the photoconductor in the main scanning direction is low at one end (the incident light side Ac) and high at the other side (Ad).

Figure 7:
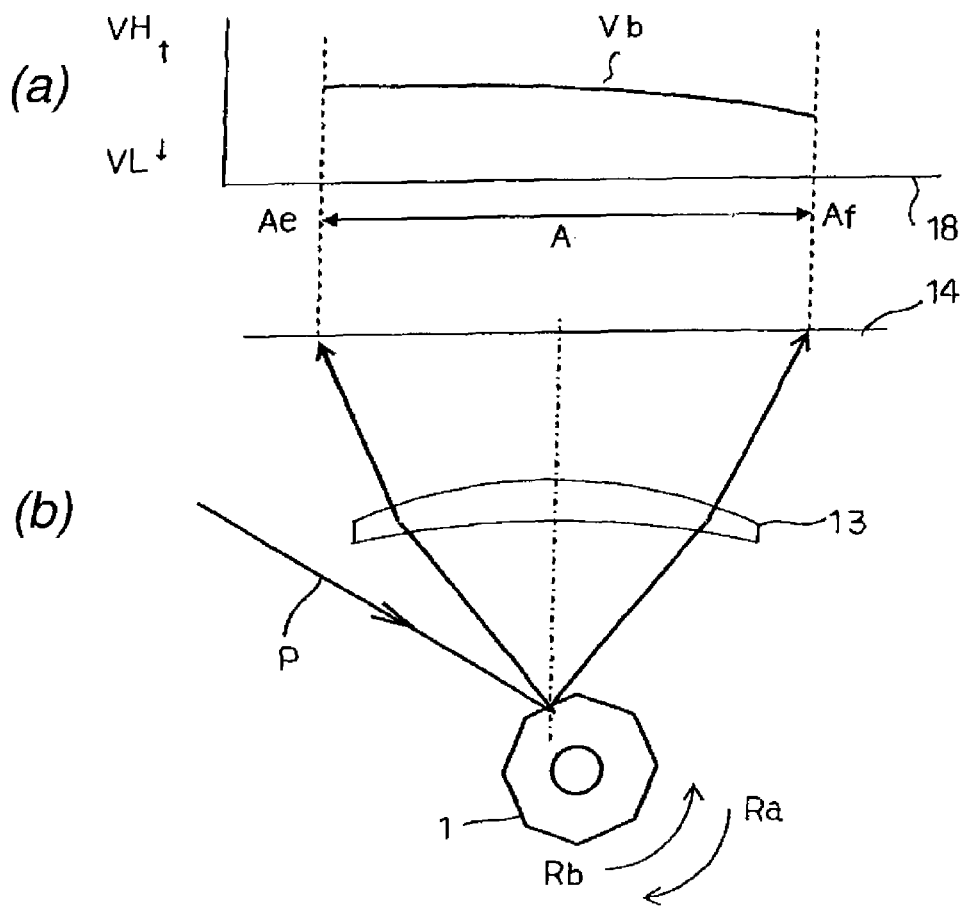
FIG. 7 is an explanatory view showing an example in which P-polarized light is incident.

FIG. 7 is a descriptive view showing an example layout of an optical system and an example distribution of light quantity, both of which pertain to the P-polarized incident light. In FIG. 7, those elements which are the same as those shown in FIG. 6 are assigned the same reference numerals, and only differences between FIGS. 6 and 7 will be described. In an example characteristic chart, which is shown in FIG. 7(a) and shows the relationship between the distribution of light quantity Vb and axial positions on the photoconductor, light quantity exhibits a high distribution at Ae, which becomes an incident light side of the image forming range A, and exhibits a low distribution at Af. Consequently, in FIG. 7, the distribution of light quantity on the photoconductor in the main scanning direction thereof is high at one end (the incident light side Ae) and low at the other end (Af).

As shown in FIGS. 6 and 7, in the optical scanning device of the fourth embodiment of the present invention, the scanning optical system is laid out such that the distribution of light quantity on the photoconductor achieved in the main scanning direction thereof becomes high at one end and low at the other end. The distribution of light quantity on the photoconductor achieved in the main scanning direction thereof can be caused to correspond to the distribution of light quantity achieved in the flowing direction of the air currents existing around the beam exit window (the direction of air currents). Specifically, the direction of air currents present around the beam exit window corresponds to the main scanning direction of the photoconductor.

The drop in light quantity induced by stains on the beam exit window 6 as described by reference to FIG. 16(c) can be canceled by the layout of the scanning optical system where the distribution of light quantity shown in FIGS. 6 and 7 is achieved. As a result of adoption of such a layout configuration of the scanning optical system, deterioration of image quality, such as inconsistencies in the density of a printed image, can be prevented.

Figure 4:
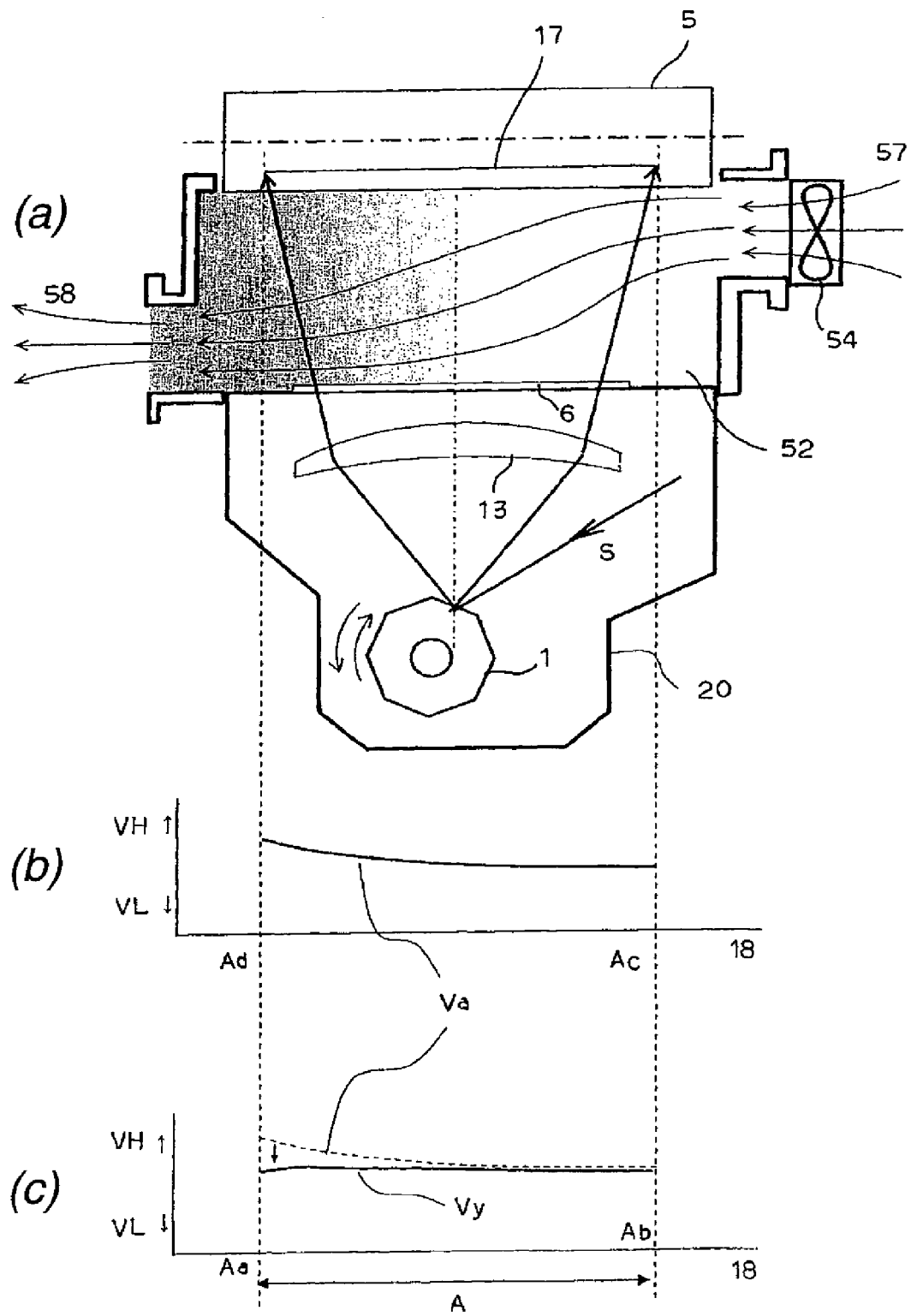
FIG. 4 is a descriptive view showing a fourth embodiment of the present invention.

FIG. 4 is a descriptive view showing a fourth embodiment of the present invention. FIG. 4 shows the example S-polarized incident light described by reference to FIG. 6. The direction of air currents shown in FIG. 4(a) corresponds to the configuration shown in FIG. 16(a). FIG. 4(b) corresponds to the distribution of light quantity caused by incidence of S-polarized light shown in FIG. 6(a). FIG. 4(c) corresponds to the distribution of the light quantity shown in FIG. 16(c). The light quantity distribution initial value Va shown in FIG. 4(c) employs the characteristic shown in FIG. 6(a), and reference symbol Vy designates the distribution of light quantity after lapse of time.

As mentioned above, in the fourth embodiment of the present invention, the characteristic chart showing time-varying changes in light quantity induced by stains on a beam exit window 6 shown in FIG. 4(c) is made to correspond to the distribution of light quantity of S-polarized light shown in FIG. 6(a). Namely, the optical scanning device 20 is arranged such that a downstream side 58 of the air currents, where light quantity is decreased by stains on the beam exit window 6, comes to a high part of the distribution of quantity of S-polarized incident light. In contrast, the optical scanning device 20 is arranged such that an upstream side 57 of the air currents, where light quantity is not decreased by stains on the beam exit window 6, comes to a low portion of the distribution of quantity of S-polarized incident light (the incident light side).

By means of the relationship between the direction of air currents achieved in the beam exit window 6 and the optical scanning device 20, the distribution of light quantity caused by the layout of the optical scanning device 20 cancels a drop in light quantity caused by time-varying stains on the beam exit window 6, whereby the quantity of light emitted to the photoconductor 5 is made uniform. Therefore, inconsistencies in density are reduced, and occurrence of out-of-register colors is also prevented. Accordingly, deterioration of image quality of a print can be prevented.

Figure 5:
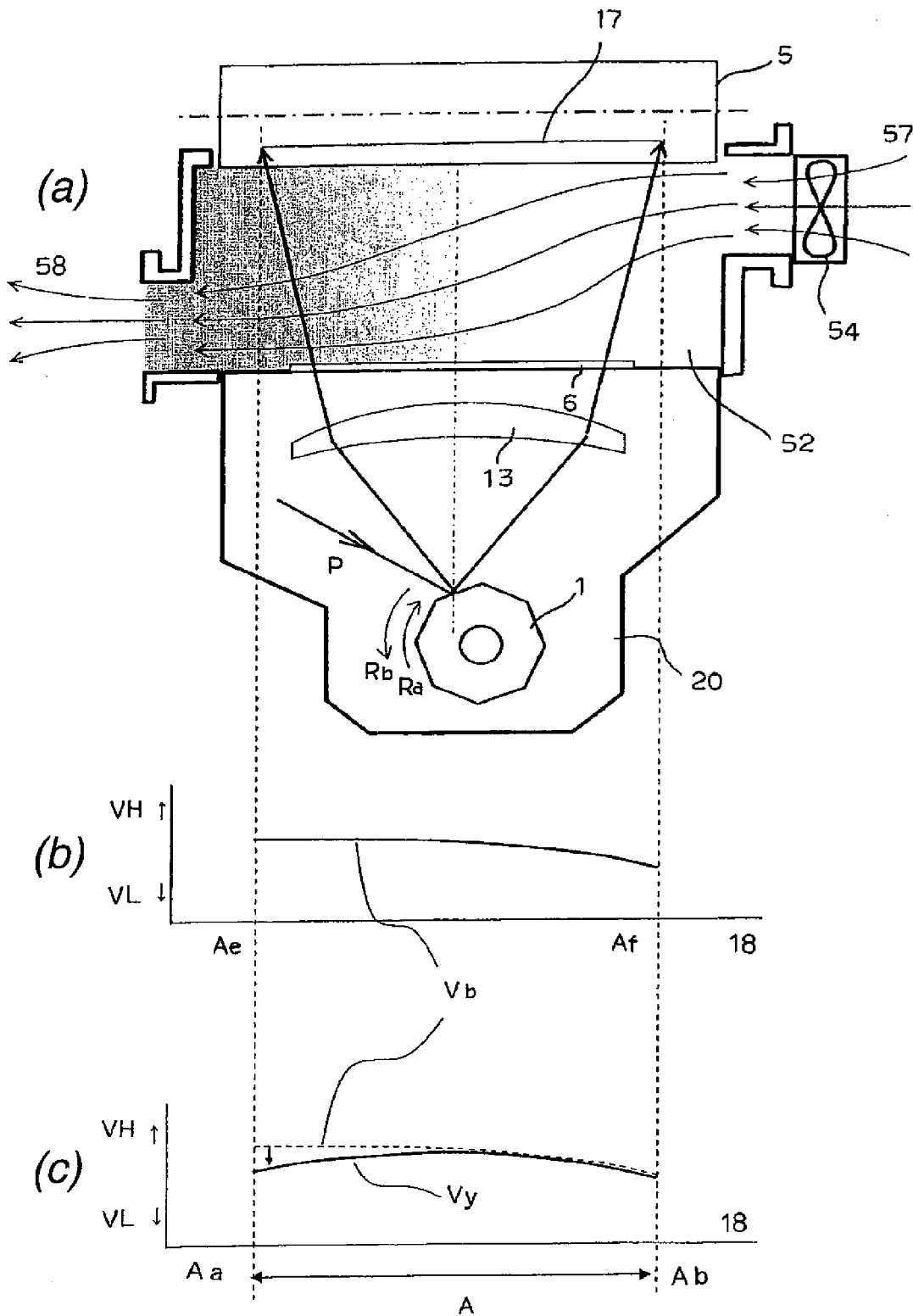
FIG. 5 is a descriptive view showing another embodiment of the fourth embodiment of the present invention.

FIG. 5 is a descriptive view showing another embodiment of the fourth embodiment of the present invention. FIG. 5 shows an example of the incidence of P-polarized light described by reference to FIG. 7. Those elements which are the same as those shown in FIG. 4 are assigned the same reference numerals, and only differences between FIGS. 4 and 5 will be explained. In the embodiment shown in FIG. 5, FIG. 5 corresponds to FIG. 7(a), and FIG. 4(c) corresponds to FIG. 16(c). The light quantity distribution initial value Vb shown in FIG. 7(a) is used as a light quantity distribution initial value Vb shown in FIG. 5(c).

In FIG. 5, the optical scanning device 20 is arranged such that the downstream side (Aa) 58 of the air currents, where light quantity is decreased by stains on the beam exit window 6, comes to the high part (the incident light side) of the distribution of quantity of P-polarized incident light. In contrast, the optical scanning device 20 is arranged such that the upstream side (Ab) 57 of the air currents, where light quantity is not decreased by stains on the beam exit window 6, comes to a low portion of the distribution of quantity of P-polarized incident light.

In the case of the configuration shown in FIG. 5, the distribution of light quantity caused by the layout of the optical scanning device 20 cancels a drop in light quantity caused by time-varying stains on the beam exit window 6, whereby the quantity of light emitted to the photoconductor 5 is made uniform. Therefore, deterioration of image quality of a print can be prevented.

Specifically, the image forming apparatus according to the fourth embodiment of the present invention is an image forming apparatus which is provided with at least one image forming station, where charging means, exposure means using an optical scanning device, development means, and transfer means are disposed around a photoconductor, and which transfers onto a transfer medium a toner image formed by the image forming station, wherein the air currents 57, 58 present in a space, through which passes a light beam emitted from a beam exit window 6 of the optical scanning device 20 toward the photoconductor 5, flows in an axial direction of the photoconductor 5; and a part of the optical scanning device 20, whose light quantity in a distribution of light quantity achieved in a main scanning direction of the optical scanning device 20 decreases, is arranged at a downstream end of air currents existing around the beam exit window 6. In the image forming apparatus of the fourth embodiment, the optical scanning device 20 has the rotary polygon mirror 1, and scans the photoconductor 5 by use of a light beam deflected by the rotary polygon mirror.

An another image forming apparatus according to the fourth embodiment of the present invention is an image forming apparatus which is provided with at least one image forming station, where charging means, exposure means using an optical scanning device, development means, and transfer means are disposed around a photoconductor, and which transfers onto a transfer medium a toner image formed by the image forming station, wherein the air currents 57, 58 present in a space, through which passes a light beam emitted from a beam exit window 6 of the optical scanning device 20 toward the photoconductor 5, flow in an axial direction of the photoconductor 5; the optical scanning device 20 deflects an incident light beam of S-polarized light by use of the rotary polygon mirror 1, to thus effect optical scanning operation; and the incident light enters the rotary polygon mirror 1 from a position upstream 57 of the air currents present around the beam exit window 6, with respect to an optical axis of a scanning optical system.

An another image forming apparatus according to the fourth embodiment of the present invention is an image forming apparatus which is provided with at least one image forming station, where charging means, exposure means using an optical scanning device, development means, and transfer means are disposed around a photoconductor, and which transfers onto a transfer medium a toner image formed by the image forming station, wherein the air currents 57, 58 present in a space, through which passes a light beam emitted from a beam exit window 6 of the optical scanning device 20 toward the photoconductor 5, flow in an axial direction of the photoconductor 5; the optical scanning device 20 deflects an incident light beam of P-polarized light by use of the rotary polygon mirror 1, to thus effect optical scanning operation; and the incident light enters the rotary polygon mirror 1 from a position downstream 58 of the air currents existing around the beam exit window 6, with respect to an optical axis of a scanning optical system.

In the fourth embodiment of the present invention, air currents in a space, through which passes a light beam emitted from a beam exit window of the optical scanning device toward the photoconductor, flow in an axial direction of the photoconductor; and the photoconductor is arranged such that a part of the optical scanning device, whose light quantity in a distribution of light quantity achieved in a main scanning direction of the optical scanning device is high, comes to a downstream side of air currents. By means of such a configuration, a layout is made such that the distribution of light quantity, which is deteriorated by stains on the beam exit window of the optical scanning device with lapse of time, and the original distribution of light quantity of the optical scanning device cancel each other, to thus lessen inconsistencies in the density of a printed image.

An image forming apparatus according to a fifth embodiment of the present invention will be described hereinbelow. In the fifth embodiment of the present invention, the optical scanning device and the photoconductor are arranged, in consideration of the characteristic of the distribution of quantity of S-polarized light and the characteristic of the distribution of quantity of P-polarized light, which enter such a rotary polygon mirror, thereby addressing unevenness in sensitivity attributable to variations in the axial film thickness of the photoconductor and preventing occurrence of inconsistencies in the density of a printed image.

In the fifth embodiment of the present invention, the characteristic of unevenness in the axial distribution of film thickness of the photoconductor, such as that described by reference to FIG. 20(a) and the characteristic of unevenness in the axial distribution of sensitivity of the photoconductor, such as that described by reference to FIG. 20(b), are combined with the characteristic of the distribution of light quantity of the optical scanning device, shown in FIGS. 6 and 7, achieved in the axial direction thereof, thereby preventing deterioration of image quality such as inconsistencies in the density of a printed image.

Namely, the image forming apparatus of the fifth embodiment of the present invention is characterized by the image forming apparatus wherein the optical scanning device and the photoconductor are arranged such that a distribution of light quantity of the optical scanning device achieved in a main scanning direction thereof compensates for a distribution of sensitivity of the photoconductor. Further, the image forming apparatus of the fifth embodiment of the present invention is characterized in that the optical scanning device and the photoconductor are arranged such that a portion of the photoconductor whose film thickness increases comes to a portion of a distribution of light quantity of the optical scanning device achieved in a main scanning direction thereof, where light quantity decreases; and such that a portion of the photoconductor whose film thickness decreases comes to a portion of the optical scanning device, where light quantity increases.

As mentioned above, the layout of the optical scanning device shown in FIGS. 6 and 7 compensates for the characteristic of unevenness in the axial distribution of film thickness of the photoconductor and the characteristic of unevenness in the axial distribution of sensitivity of the photoconductor, thereby preventing deterioration of image quality such as inconsistencies in density. Therefore, deterioration of image quality, such as inconsistencies in the density of a printed image, can be prevented by means of setting only the layout of the incident light side for S-polarized or P-polarized light on the rotary polygon mirror in accordance with the previously-measured distribution of film thickness of the photoconductor. Therefore, since special components or control for preventing deterioration of image quality, which would otherwise be caused by a drop in charging capability, are not necessary, print quality can be simply enhanced at low cost.

Figure 9:
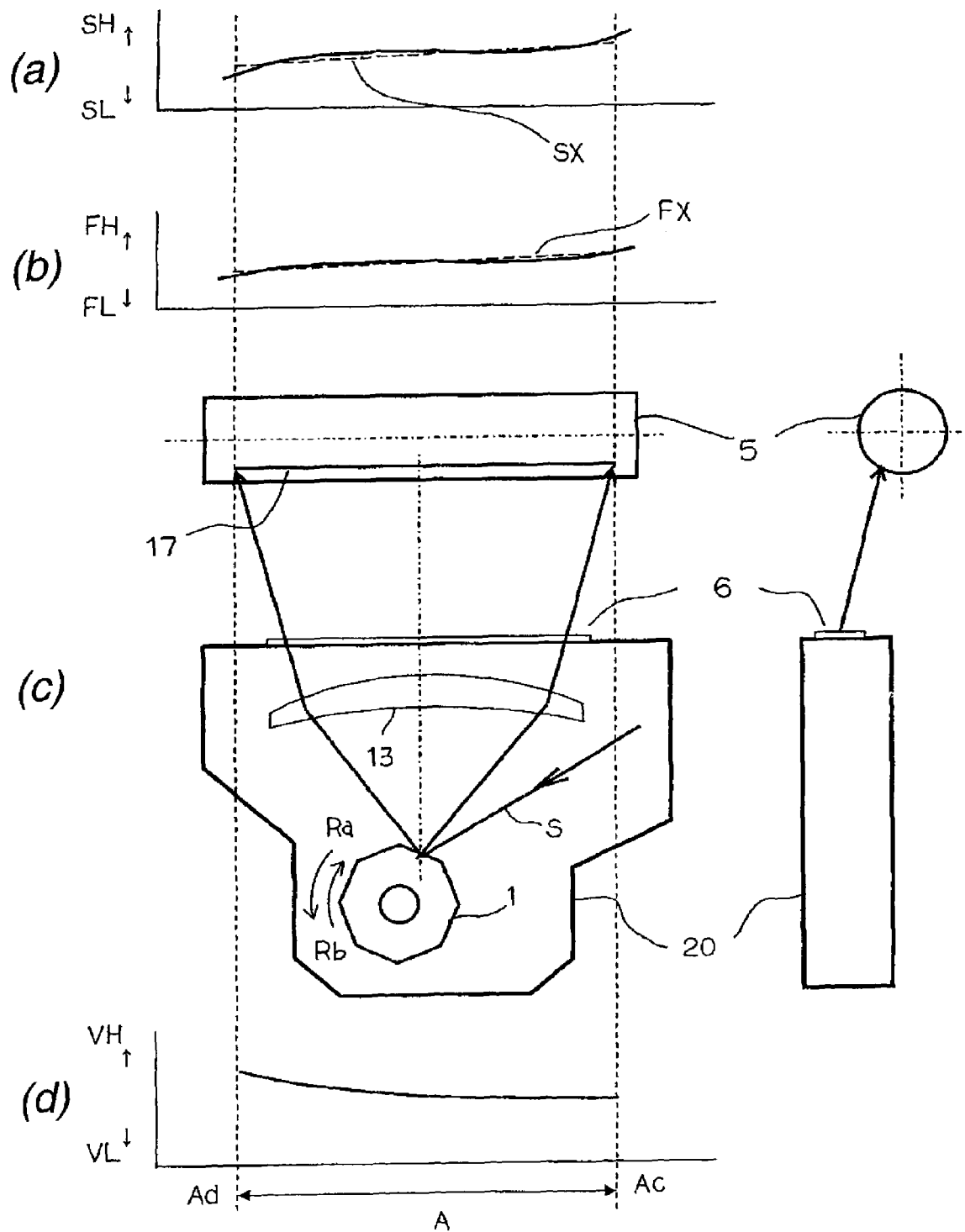
FIG. 9 is a descriptive view showing a fifth embodiment of the present invention.

FIG. 9 is a descriptive view showing the fifth embodiment of the present invention. In FIG. 9, an optical scanning device 20 using S-polarized incident light has the rotary polygon mirror 1 and the scanning optical system 13. A light beam is emitted from a beam exit window 6 to a photoconductor 5. Reference numeral 17 designates a scan line. FIG. 9(a) is a characteristic chart showing the distribution of sensitivity corresponding to axial positions on the photoconductor 5, wherein reference symbol SX designates an approximate straight line of the distribution of sensitivity. FIG. 9(b) is a characteristic view of the distribution of film thickness corresponding to axial positions on the photoconductor 5, wherein reference symbol FX designates an approximate straight line of the distribution of film thickness. Moreover, FIG. 9(d) is a characteristic chart which is analogous to FIG. 6 and shows a relationship between the distribution of light quantity and axial positions on the photoconductor.

In the embodiment shown in FIG. 9, the image forming apparatus has an optical scanning device where S-polarized light enters the rotary polygon mirror. The optical scanning device and the photoconductor are arranged such that the high-sensitivity portion of the axial distribution of sensitivity on the photoconductor comes to the incident light side Ac with respect to the optical axis of the scanning optical system. Adoption of such a configuration compensates for lowness in the distribution of light quantity achieved at the incident light side during entrance of S-polarized light. Consequently, the axial sensitivity of the photoconductor is made even, to thus prevent inconsistencies in the density of a printed image.

In the embodiment shown in FIG. 9, in the optical scanning device where S-polarized light enters the rotary polygon mirror, the optical scanning device and the photoconductor are arranged such that the portion of the photoconductor whose film thickness is increased by axial deviation of the film thickness comes to the incident light side Ac with respect to the optical axis of the scanning optical system. Adoption of such a configuration compensates for lowness in the distribution of light quantity achieved at the incident light side during entrance of S-polarized light.

Figure 10:
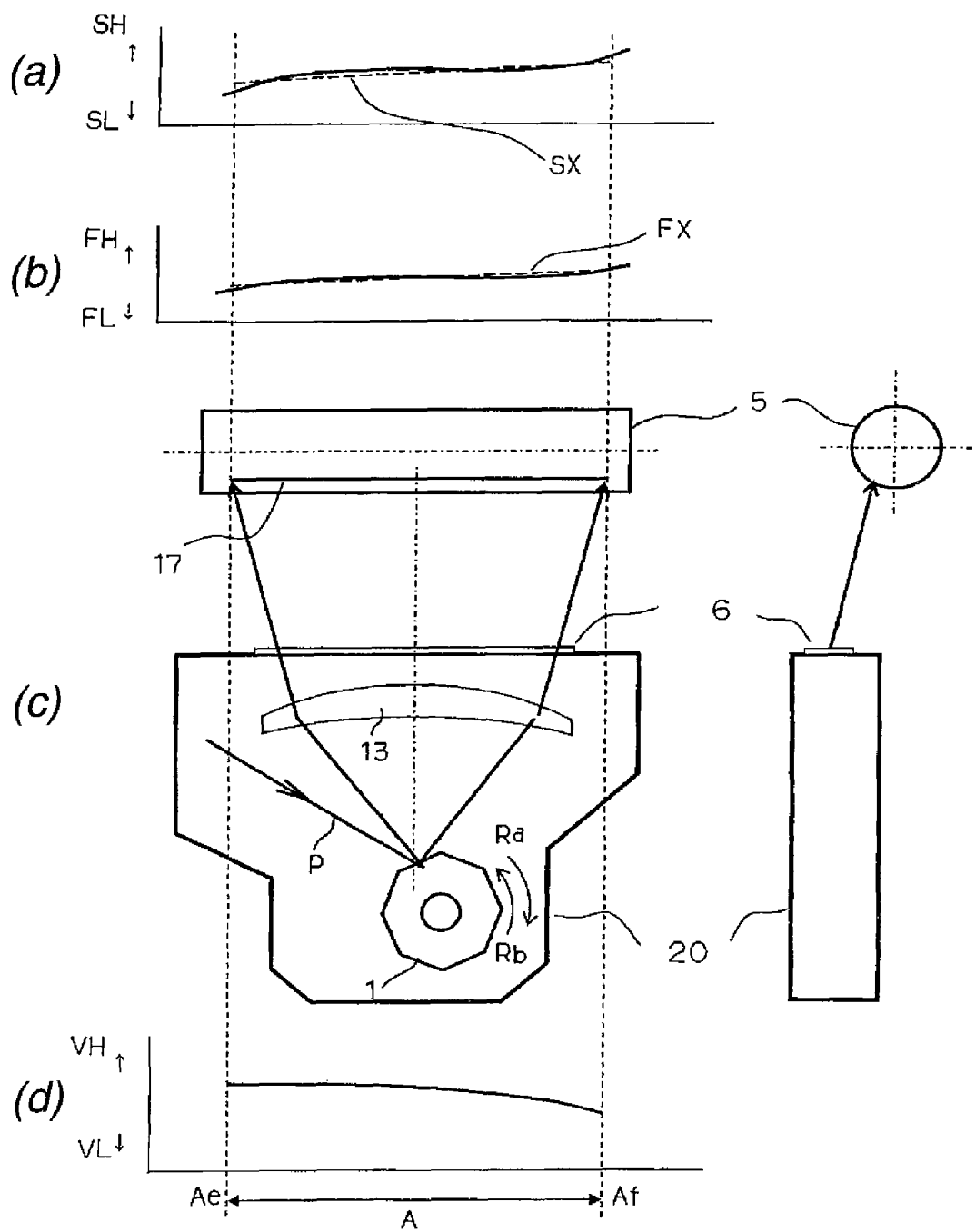
FIG. 10 is a descriptive view showing another embodiment of the fifth embodiment of the present invention.

FIG. 10 is a descriptive view showing another embodiment of the fifth embodiment of the present invention. Differences between FIGS. 9 and 10 will be chiefly described. The optical scanning device 20 shown in FIG. 10 has a configuration using P-polarized incident light. FIG. 10(d) is a characteristic chart which is analogous to FIG. 7(a) and shows a relationship between the distribution of light quantity and axial positions on the photoconductor. In the embodiment shown in FIG. 10, the image forming apparatus has an optical scanning device where P-polarized light enters the rotary polygon mirror. The optical scanning device and the photoconductor are arranged such that the low-sensitivity portion of the axial distribution of sensitivity on the photoconductor comes to the incident light side Ae with respect to the optical axis of the scanning optical system. Adoption of such a configuration compensates for highness in the distribution of light quantity achieved at the incident light side during entrance of P-polarized light, to thus obtained a uniform image.

In the embodiment shown in FIG. 10, the image forming apparatus has the optical scanning device where P-polarized light enters the rotary polygon mirror. The optical scanning device and the photoconductor are arranged such that the portion of the photoconductor whose film thickness is decreased by axial deviation of the film thickness comes to the incident light side Ae with respect to the optical axis of the scanning optical system. Adoption of such a configuration compensates for highness in the distribution of light quantity achieved at the incident light side during entrance of P-polarized light, to thus obtained a uniform image.

Specifically, the image forming apparatus of the fifth embodiment of the present invention is an image forming apparatus provided with at least one image forming station, where charging means, exposure means using an optical scanning device, development means, and transfer means are disposed around a photoconductor, and which transfers onto a transfer medium a toner image formed by the image forming station, wherein the optical scanning device and the photoconductor are arranged such that a distribution of light quantity of the optical scanning device achieved in a main scanning direction thereof compensates for a distribution of sensitivity of the photoconductor. In the image forming apparatus, the optical scanning device preferably has a rotary polygon mirror, and scanning of a light beam effected by the rotary polygon mirror preferably compensates for the distribution of sensitivity of the photoconductor.

Another image forming apparatus of the fifth embodiment of the present invention is an image forming apparatus which is provided with at least one image forming station, where charging means, exposure means using an optical scanning device, development means, and transfer means are disposed around a photoconductor, and which transfers onto a transfer medium a toner image formed by the image forming station, wherein the optical scanning device and the photoconductor are arranged such that a portion of the photoconductor whose film thickness increases comes to a portion of a distribution of light quantity of the optical scanning device achieved in a main scanning direction thereof, where light quantity decreases; and such that a portion of the photoconductor whose film thickness decreases comes to a portion of the optical scanning device, where light quantity increases. In the image forming apparatus, the optical scanning device preferably has a rotary polygon mirror, and preferably compensates for inplane unevenness in a printed image, which would otherwise be caused by a deviation in a film thickness of the photoconductor, by means of a characteristic of distribution of light quantity achieved on the rotary polygon mirror.

Yet another image forming apparatus of the fifth embodiment of the present invention is an image forming apparatus which is provided with at least one image forming station, where charging means, exposure means using an optical scanning device, development means, and transfer means are disposed around a photoconductor, and which transfers onto a transfer medium a toner image formed by the image forming station, wherein the optical scanning device has a rotary polygon mirror into which S-polarized light enters, and the optical scanning device and the photoconductor are arranged such that a high-sensitivity side of an axial distribution of sensitivity of the photoconductor comes to an incident light side of a scanning optical system with respect to an optical axis thereof.

Still another image forming apparatus of the fifth embodiment of the present invention is an image forming apparatus which is provided with at least one image forming station, where charging means, exposure means using an optical scanning device, development means, and transfer means are disposed around a photoconductor, and which transfers onto a transfer medium a toner image formed by the image forming station, wherein the optical scanning device has a rotary polygon mirror into which S-polarized light enters, and the optical scanning device and the photoconductor are arranged such that a portion of the photoconductor, whose film thickness is increased by axial deviation of the film thickness of the photoconductor, comes to an incident light side of the scanning optical system with respect to an optical axis.

Yet another image forming apparatus of the fifth embodiment of the present invention is an image forming apparatus which is provided with at least one image forming station, where charging means, exposure means using an optical scanning device, development means, and transfer means are disposed around a photoconductor, and which transfers onto a transfer medium a toner image formed by the image forming station, wherein the optical scanning device has a rotary polygon mirror into which P-polarized light enters, and the optical scanning device and the photoconductor are arranged such that a low-sensitivity side of an axial distribution of sensitivity of the photoconductor comes to an incident light side of a scanning optical system with respect to an optical axis thereof.

Still another image forming apparatus of the fifth embodiment of the present invention is an image forming apparatus which is provided with at least one image forming station, where charging means, exposure means using an optical scanning device, development means, and transfer means are disposed around a photoconductor, and which transfers onto a transfer medium a toner image formed by the image forming station, wherein the optical scanning device has a rotary polygon mirror into which P-polarized light enters, and the optical scanning device and the photoconductor are arranged such that a portion of the photoconductor, whose film thickness is decreased by axial deviation of the film thickness of the photoconductor, comes to an incident light side of the scanning optical system with respect to an optical axis.

In the fifth embodiment of the present invention, the optical scanning device and the photoconductor are arranged such that a distribution of light quantity of the optical scanning device compensates for a distribution of sensitivity of the photoconductor attributable to deviation of the film thickness of a photoconductor. By means of such a configuration, there can be provided an image forming apparatus which prevents deterioration of image quality by means of addressing unevenness in the axial film thickness of a photoconductor to thus lessen inconsistencies in the density of a printed image. The optical scanning device and the photoconductor are arranged in consideration of the layout of an incident light side for S-polarized or P-polarized light which enters a rotary polygon mirror, so that an image forming apparatus which prevents deterioration of image quality can be provided.

An image forming apparatus according to a sixth embodiment of the present invention will be described hereinbelow. In the sixth embodiment of the present invention, the layout of the optical scanning device is set with respect to the direction (an upstream or downstream direction) of the air currents circulating around the charging device, in consideration of the characteristic of the distribution of quantity of S-polarized light and the characteristic of the distribution of quantity of P-polarized light, which enter such a rotary polygon mirror.

In the sixth embodiment of the present invention, inconsistencies in the density of an image are eliminated by use of the characteristic of the distribution of light quantity achieved in the direction of the air currents present around the charging device. In the example shown in FIG. 6, in view of the relationship between the air currents circulating around the charging device and the distribution of light quantity, the optical scanning device employing incidence of S-polarized light is arranged such that the distribution of light quantity becomes low at the downstream end of the air currents and the distribution of light quantity becomes high at the upstream end of the air currents.

In the example shown in FIG. 7, in relation to the relationship between the air currents circulating around the charging device and the distribution of light quantity, the optical scanning device employing incidence of P-polarized light is arranged such that the distribution of light quantity is low at the downstream end of the air currents and high at the upstream end of the air currents, as in the case of FIG. 6.

Figure 11:
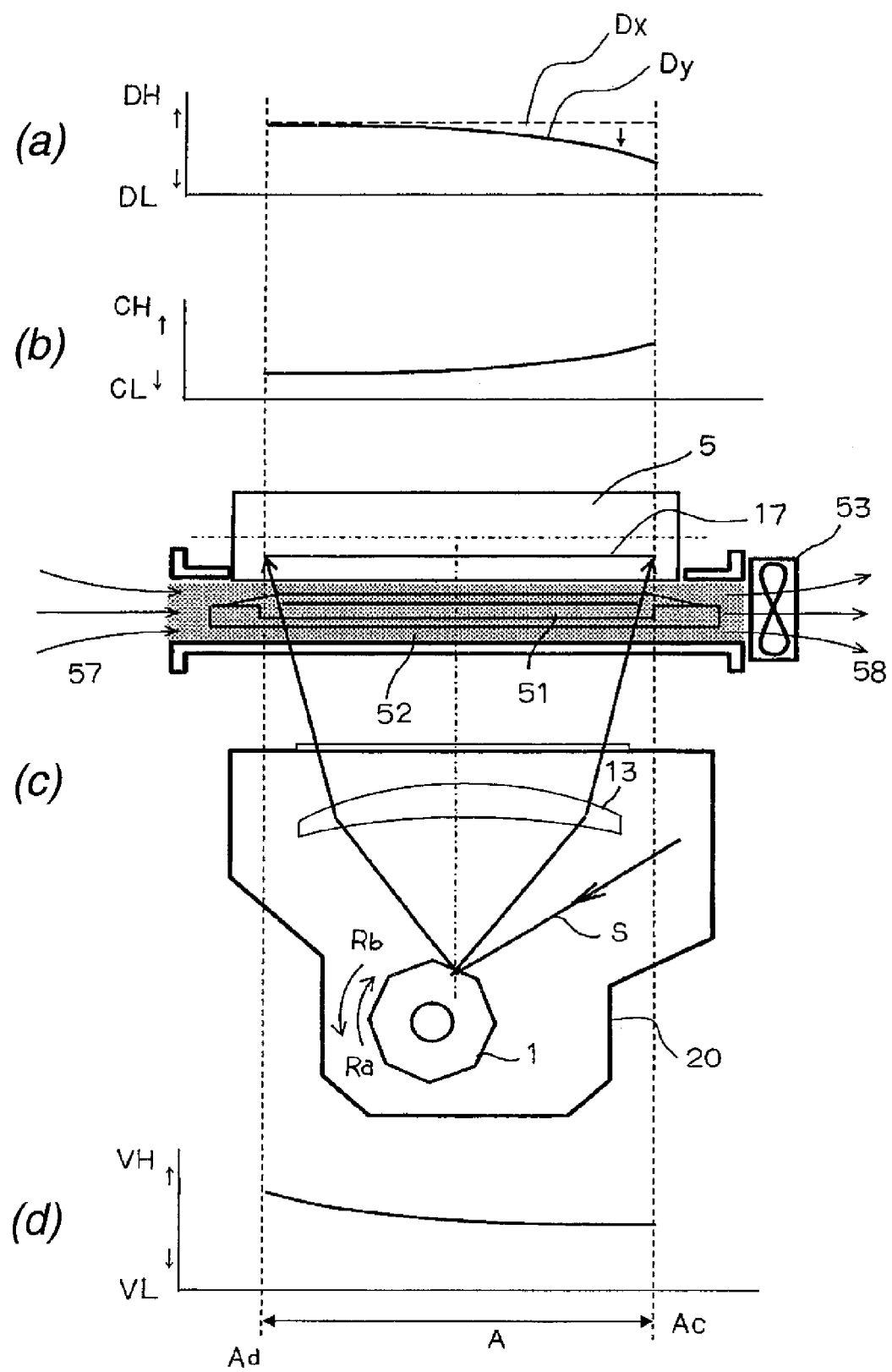
FIG. 11 is a descriptive view showing a sixth embodiment of the present invention.

By reference to FIGS. 11 and 12, the relationship between the circulating direction of the air currents present around the charging device and the distribution of light quantity is described in connection with the example incidence of S-polarized light and the example incidence of P-polarized light, which have been described by reference to FIGS. 6 and 7. FIG. 11 is a descriptive view showing the sixth embodiment using incidence of S-polarized light of the present invention. In FIG. 11, an optical scanning device 20 has the rotary polygon mirror 1 and the scanning optical system 13, and performs scanning of a light beam on a photoconductor 5 by use of a scanning line 17. The layout of an charging device 51 is the same as that shown in FIG. 18(a). Further, FIG. 11(a) corresponds to the characteristic chart showing the charging capability which has been described by reference to FIG. 18(c). FIG. 11(b) corresponds to the characteristic chart showing the degree of stains on the charging device which has been described by reference to FIG. 18(c). FIG. 11(d) corresponds to the characteristic chart showing the distribution of light quantity which has been described by reference to FIG. 6.

In the sixth embodiment shown in FIG. 11, the optical scanning device, where S-polarized light enters the rotary polygon mirror, is shown. The optical scanning device and the charging device are arranged such that the portion of the charging device whose charging capability decreases comes to Ac on the incident light side with respect to the optical axis of the scanning optical system. As mentioned above, in FIG. 11, the S-polarized light enters the rotary polygon mirror from the downstream position of the air currents present around the charging device with respect to the optical axis of the scanning optical system. Specifically, the area—where the distribution of quantity of incident light achieved at incidence of S-polarized light is low—corresponds to the area where the density of a print becomes high for reasons of a decrease in charging capability, to thus compensate for occurrence of inconsistencies in density.

Figure 12:
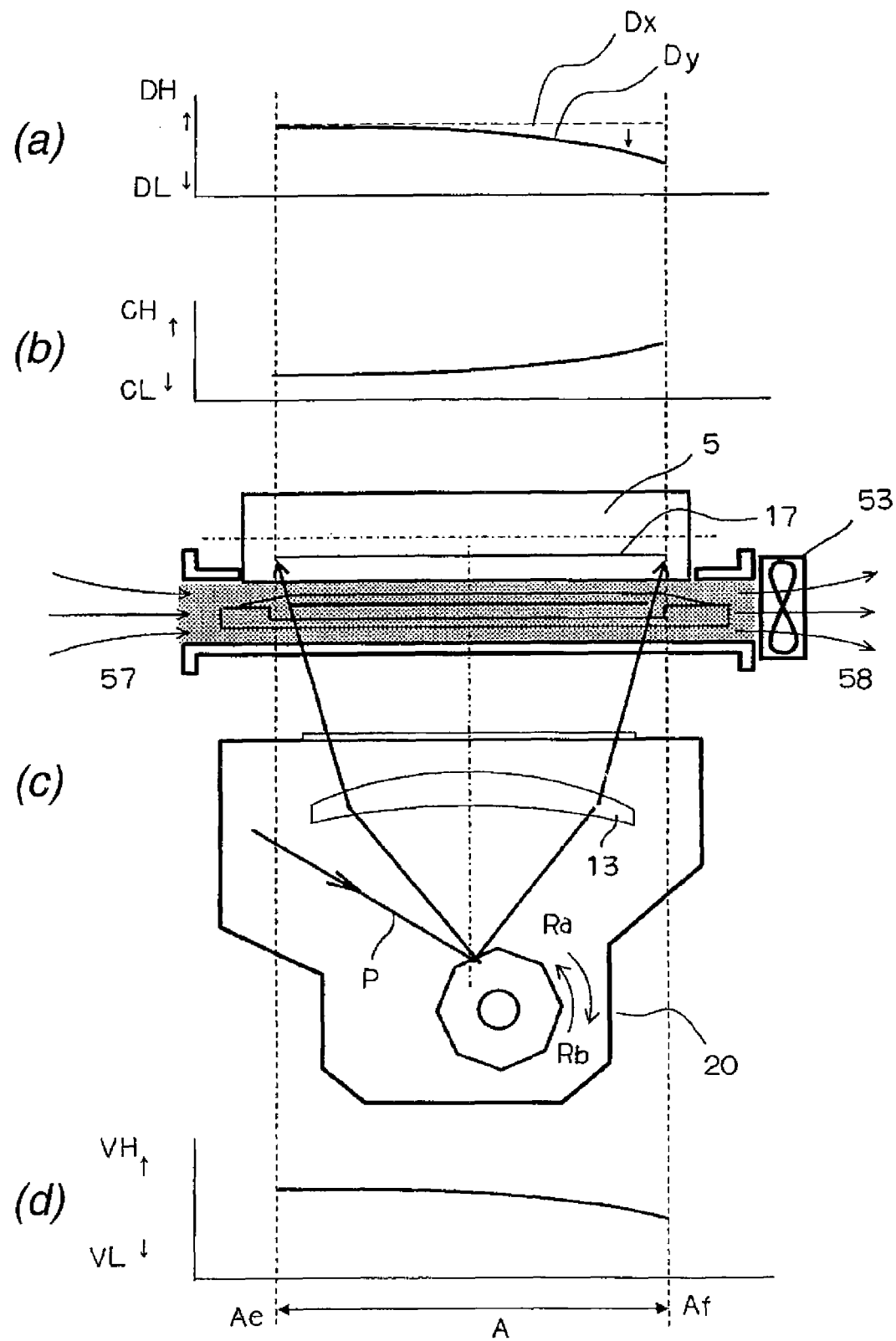
FIG. 12 is a descriptive view showing another embodiment of the sixth embodiment of the present invention.

FIG. 12 is a descriptive view showing an embodiment of incidence of P-polarized light according to the sixth embodiment of the present invention. Differences between FIGS. 11 and 12 are chiefly described. FIG. 12(d) corresponds to a characteristic chart which is analogous to FIG. 18(c) and shows a relationship between the distribution of light quantity and axial positions on the photoconductor 5. In the embodiment shown in FIG. 12, P-polarized light enters the rotary polygon mirror of the optical scanning device, and the portion of the charging device whose charging capability does not decrease is arranged at the incident light side Ae with respect to the optical axis of the scanning optical system. In this case, the incident light beam of P-polarized light enters the rotary polygon mirror 1 from the position at an upstream end of the air currents present around the charging device.

The embodiment shown in FIG. 12 shows a case where the optical scanning device is arranged in consideration of the direction of air currents present around the charging device when P-polarized light is used as a light beam which is to enter the rotary polygon mirror. Specifically, the light entering the rotary polygon mirror is caused to enter the optical axis of the scanning optical system from the upstream end of the air currents present around the charging device. As a result of adoption of such a configuration, occurrence of inconsistencies in density attributable to unevenness in charging capability of the charging device is prevented by means of a characteristic of the distribution of light quantity acquired at the time of entrance of P-polarized light.

As shown in FIGS. 11 and 12, in the optical scanning device according to the sixth embodiment of the present invention, the scanning optical system is laid out such that the distribution of light quantity on the photoconductor acquired in the main scanning direction thereof; namely, the distribution of light quantity acquired in the direction of the air currents circulating around the charging device, becomes high at the upstream end and low at the downstream end. Specifically, the optical scanning device shown in FIGS. 6 and 7 is arranged in consideration of the characteristic of unevenness in the degree of stains on the charging device, such as that described by reference to FIG. 18(b), and the characteristic of unevenness in charging capability, such as that described by reference to FIG. 18(c), thereby preventing deterioration of image quality, such as inconsistencies in the density of a printed image.

Namely, the image forming apparatus of the sixth embodiment of the present invention is characterized by the image forming apparatus wherein air currents present around the charging device flow in an axial direction of the photoconductor; and a portion of the optical scanning device, where a drop arises in light quantity of a light quantity distribution achieved in a main scanning direction of the optical scanning device, is arranged at a downstream end of air currents present around the charging device, thereby preventing deterioration of image quality, which would otherwise be caused by stains on the charging device. The image forming apparatus of the sixth embodiment of the present invention is characterized in that the optical scanning device has a rotary polygon mirror.

As mentioned above, deterioration of image quality, such as inconsistencies in density, attributable to unevenness in charging capability is prevented by means of the layout of the optical scanning device shown in FIGS. 6 and 7. Specifically, in consideration of the characteristic of the light quantity distribution of incidence of each type of polarized light, a determination is made as to whether the incident light side for incidence of S-polarized light or P-polarized light on the rotary polygon mirror is assigned to the upstream or downstream of the direction of the air currents present around the charging device.

Therefore, deterioration of image quality, such as inconsistencies in the density of a printed image, can be prevented by means of setting only the arrangement of the incident light side for S-polarized light or P-polarized light on the rotary polygon mirror in accordance with the direction of the air currents (the upstream or downstream side) circulating around the charging device as a measure against ozone. Since special components or control for preventing deterioration of image quality, which would otherwise be caused by a drop in charging capability, are not necessary, print quality can be enhanced in a simple manner and at low cost.

Specifically, the image forming apparatus of the sixth embodiment of the present invention is an image forming apparatus provided with at least one image forming station, where an charging device, exposure means using an optical scanning device, development means, and transfer means are disposed around a photoconductor, and which transfers onto a transfer medium a toner image formed by the image forming station, wherein air currents present around the charging device flow in an axial direction of the photoconductor; and a portion of the optical scanning device, where a drop arises in light quantity of a light quantity distribution achieved in a main scanning direction of the optical scanning device, is arranged at a downstream end of air currents present around the charging device. In this image forming apparatus, the optical scanning device preferably has a rotary polygon mirror, and preferably scans the photoconductor by use of a light beam deflected by the rotary polygon mirror.

Another image forming apparatus of the sixth embodiment of the present invention is an image forming apparatus which is provided with at least one image forming station, where an charging device, exposure means using an optical scanning device, development means, and transfer means are disposed around a photoconductor, and which transfers onto a transfer medium a toner image formed by the image forming station, wherein air currents present around the charging device flow in an axial direction of the photoconductor; the optical scanning device deflects an incident light beam of S-polarized light by use of a rotary polygon mirror, to thus effect optical scanning operation; and the incident light enters the rotary polygon mirror from a position at a downstream end of the air currents present around the charging device, with respect to an optical axis of a scanning optical system.

Yet another image forming apparatus of the sixth embodiment of the present invention is an image forming apparatus which is provided with at least one image forming station, where an charging device, exposure means using an optical scanning device, development means, and transfer means are disposed around a photoconductor, and which transfers onto a transfer medium a toner image formed by the image forming station, wherein air currents present around the charging device flow in an axial direction of the photoconductor; the optical scanning device deflects an incident light beam of P-polarized light by use of a rotary polygon mirror, to thus effect optical scanning operation; and the incident light enters the rotary polygon mirror from a position at an upstream end of the air currents present around the charging device, with respect to an optical axis of a scanning optical system.

In the sixth embodiment of the present invention, a portion of the optical scanning device, where a drop arises in light quantity of a light quantity distribution achieved in a main scanning direction of the optical scanning device, is arranged at a downstream end of air currents present around the charging device. By means of such a configuration, there can be provided an image forming apparatus which reduces the quantity of light fell on an area, where the density of an image is increased as a result of the charging capability of the charging device being decreased by fine powder or the like, to thus lessen inconsistencies in the density of a printed image and prevent deterioration of image quality.

Moreover, there can be provided an image forming apparatus which sets a layout of S-polarized incident light and P-polarized incident light, both entering the rotary polygon mirror, in consideration of the direction of air currents present around the charging device; i.e., an imbalance in charging capability, thereby preventing deterioration of image quality.

Figure 13:
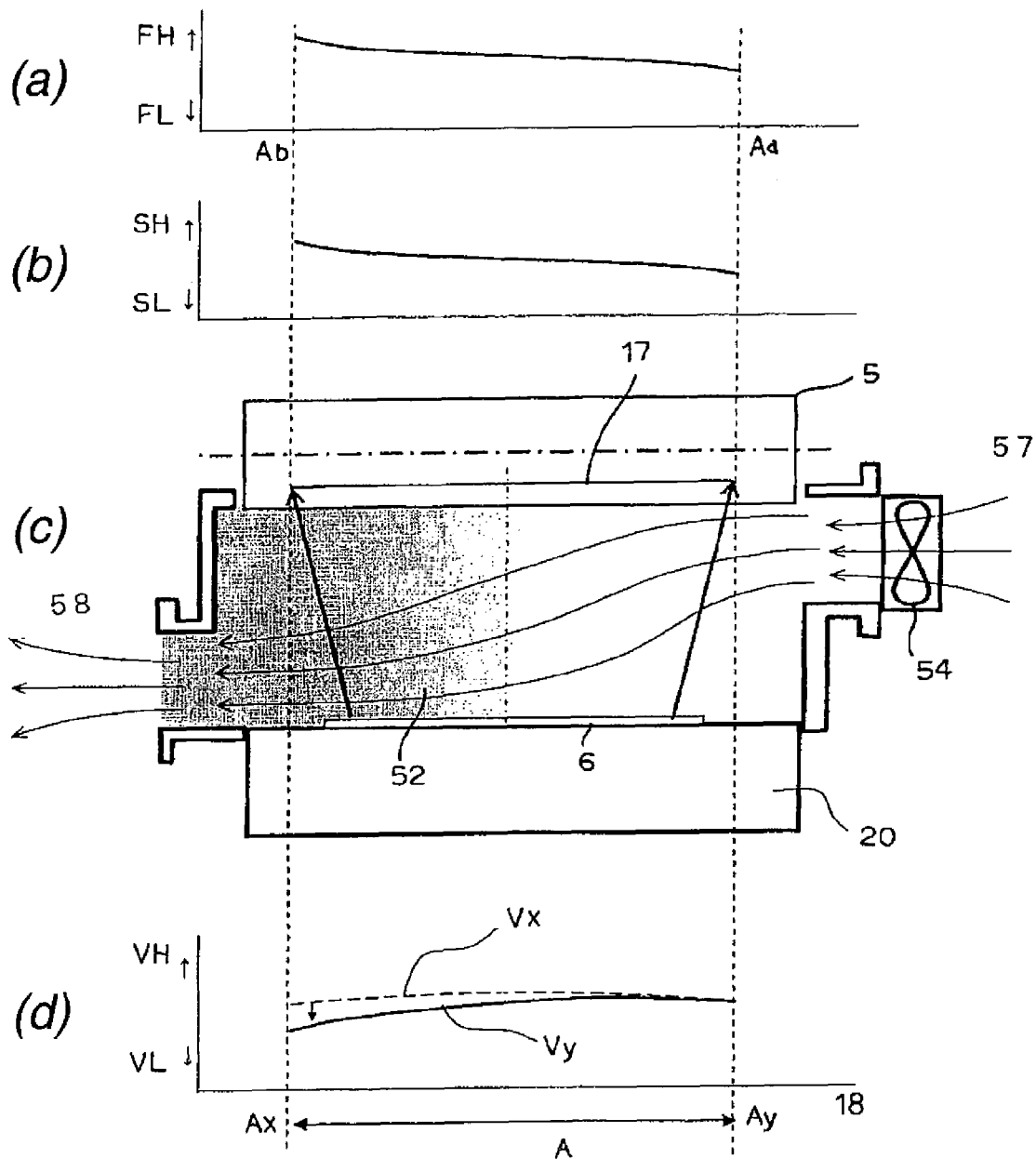
FIG. 13 is a descriptive view showing a seventh embodiment of the present invention.

An image forming apparatus according to a seventh embodiment of the present invention will be described hereinbelow. In the seventh embodiment of the present invention, attention is paid to the characteristic of the distribution of film thickness and sensitivity of the photoconductor 5 as described by FIG. 20, a drop in light quantity attributable to stains on the beam exit window is suppressed by the sensitivity of the photoconductor. The seventh embodiment of the present invention will now be described by reference to the descriptive view shown in FIG. 13. FIG. 13(c) is a view showing the layout of a beam exit window 6 of the optical scanning device 20 corresponding to the axial layout of the photoconductor 5. FIG. 13(a) corresponds to the sensitivity distribution of the photoconductor shown in FIG. 20(b), and FIG. 13(b) corresponds to the thickness of the photoconductor shown in FIG. 20(a). The characteristics of the photoconductor 5 with respect to the main scanning direction (the axial direction) shown in FIGS. 13(a) and 13(b) are reverse to those shown in FIGS. 20(a) and 20(b). Specifically, axial sensitivity is reversed with respect to the right and left directions.

Figure 16:
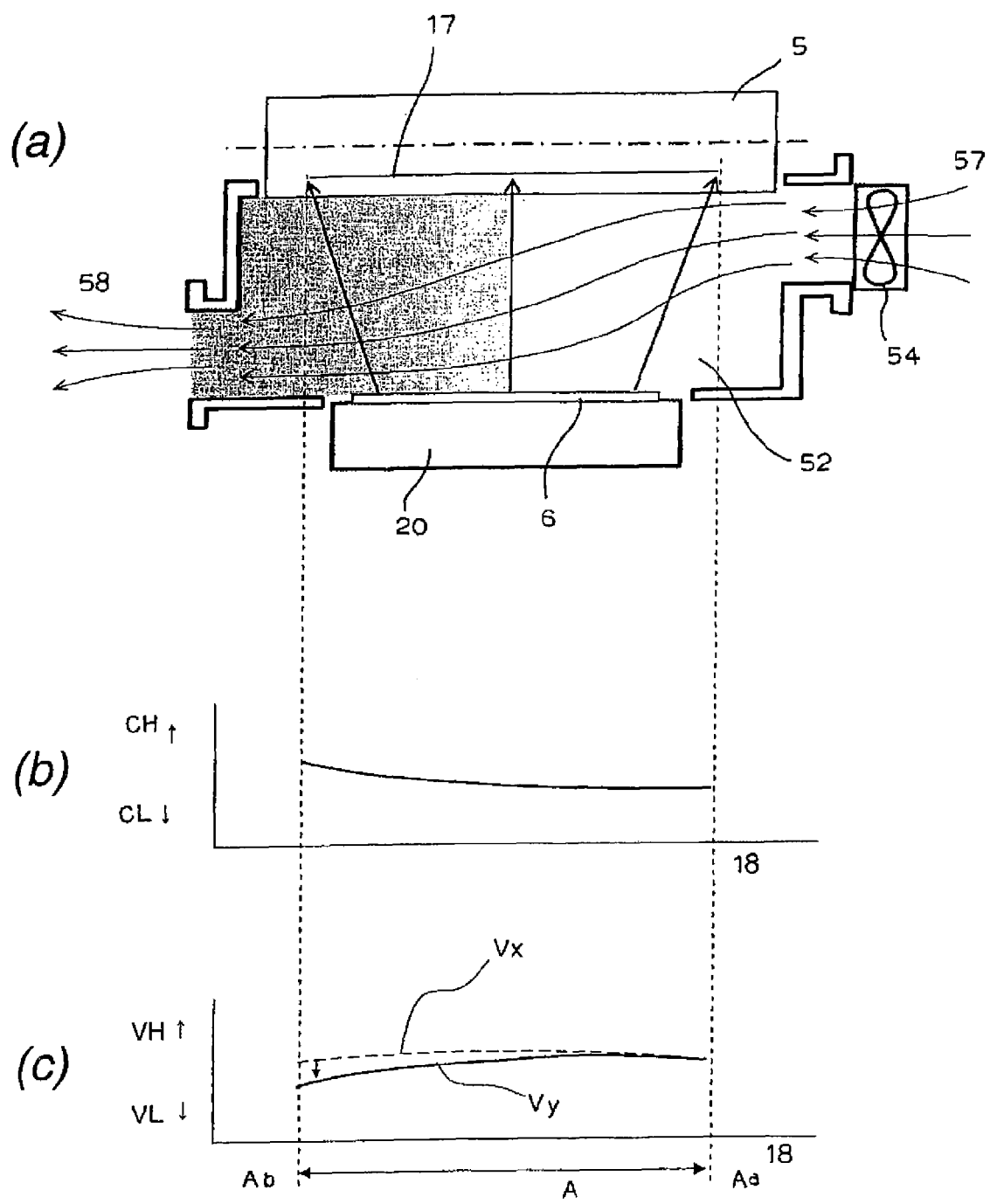
FIG. 16 is a descriptive view showing a relationship between the degree of stain achieved in the direction of air currents over a beam exit window and the quantity of light.
Figure 17A:
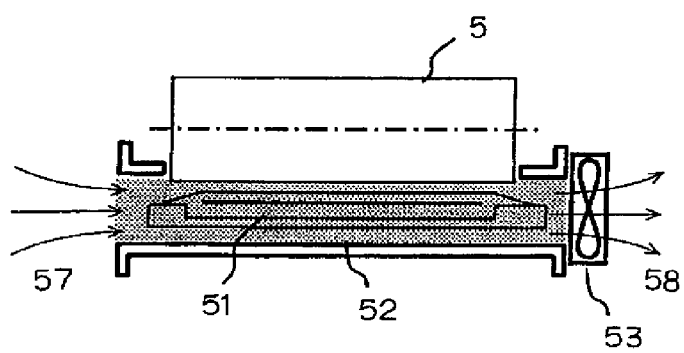
FIGS. 17A to 17C are descriptive views each showing an example layout of a photo conductor and a charging device.
Figure 17B:
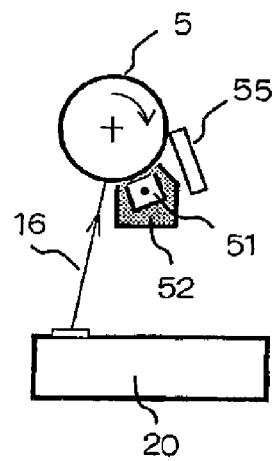
Figure 17C:
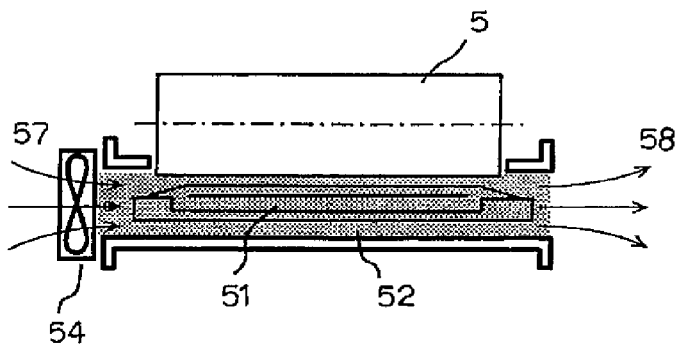

FIG. 13(d) corresponds to FIG. 16(c). As mentioned above, a characteristic chart showing time-varying changes in the quantity of light caused by stains on the beam exit window 6 shown in FIG. 13(d) is made to correspond to the sensitivity distribution of the photoconductor FIG. 13(a). Specifically, the photoconductor 5 is arranged such that a downstream side (Ax) 58 of the air currents, where light quantity is decreased by stains on the beam exit window 6, comes to a high-sensitivity portion Ab of a distribution of sensitivity of the photoconductor 5. Moreover, the photoconductor 5 is arranged such that an upstream side (Ay) 57 of the air currents, where light quantity is not decreased by stains on the beam exit window 6, comes to a low-sensitivity portion Aa of a distribution of axial sensitivity of the photoconductor 5.

By means of adoption of the layout relationship between the direction of air currents toward the beam exit window 6 and the photoconductor 5, the distribution of sensitivity stemming from the thickness of the photoconductor 5 cancels the drop in light quantity due to time-varying stains on the beam exit window 6, to thus render the quantity of light emitted to the photosensitivity 5 uniform. Therefore, inconsistencies in density are suppressed, and occurrence of out-of-register colors is also prevented. Hence, deterioration of image quality of a print can be prevented.

FIG. 13(d) and FIG. 13(b) are made to correspond to each other, and the photoconductor 5 is arranged such that a large film-thickness portion of the distribution of axial film thickness of the photoconductor 5 comes to the downstream side 58 of the air currents. Next, in relation to the direction of the air currents and the fan, the photoconductor 5 is arranged, in FIG. 13(c), such that a low-sensitivity portion of a distribution of axial sensitivity of the photoconductor 5 comes to a position where an intake fan 54 for drawing air currents 57 is disposed. The intake fan 54 for drawing the air currents 57 can be replaced with an exhaust fan 53 for sucking the air currents 58 shown in FIG. 15A. In this case, the photoconductor 5 is arranged such that a high sensitivity portion of a distribution of axial sensitivity of the photoconductor 5 comes to a position where the exhaust fan 53 for sucking the air currents 58 is disposed.

Specifically, the image forming apparatus according to the seventh embodiment of the present invention is an image forming apparatus, which is provided with at least one image forming station, where charging means, exposure means using an optical scanning device, development means, and transfer means are disposed around a photoconductor, and which transfers onto a transfer medium a toner image formed by the image forming station, wherein the air currents 57, 58 present in a space, through which passes a light beam emitted from the beam exit window 6 of the optical scanning device 20 toward the photoconductor 5, flow in an axial direction of the photoconductor 5; and the photoconductor 5 is arranged such that a high-sensitivity portion of a distribution of axial sensitivity of the photoconductor 5 comes to a downstream side of the air currents 58.

An another image forming apparatus according to the seventh embodiment of the present invention is an image forming apparatus, wherein the air currents 57, 58 present in a space, through which passes a light beam emitted from a beam exit window 6 of the optical scanning device 20 toward the photoconductor 5, flow in an axial direction of the photoconductor 5; and the photoconductor 5 is arranged such that a large film-thickness portion of a distribution of axial film thickness of the photoconductor 5 comes to a downstream side of the air currents.

A still another image forming apparatus according to the seventh embodiment of the present invention is an image forming apparatus, wherein the photoconductor 5 is arranged such that a high-sensitivity portion of a distribution of axial sensitivity of the photoconductor 5 comes to a position where the exhaust fan 53 for sucking air currents 58 is disposed in a space through which passes a light beam emitted from the beam exit window 6 of the optical scanning device 20 toward the photoconductor 5. The image forming apparatus corresponds to the configuration shown in FIG. 15A.

Figure 15C:
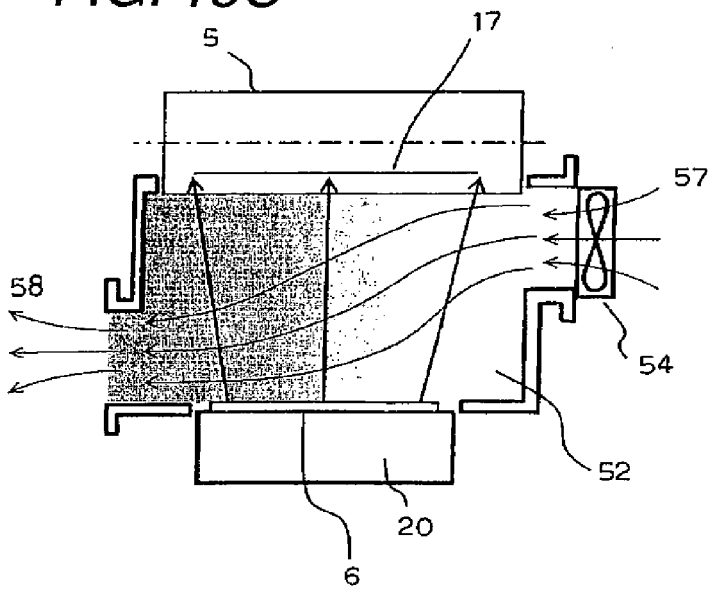

A still another image forming apparatus according to the seventh embodiment of the present invention is an image forming apparatus, wherein the photoconductor 5 is arranged such that a low sensitivity portion of a distribution of axial sensitivity of the photoconductor 5 comes to a position where an intake fan for drawing air currents 57 is disposed in a space through which passes a light beam emitted from a beam exit window 6 of the optical scanning device 20 toward the photoconductor 5. The image forming apparatus corresponds to the configurations shown in FIGS. 13 and 15C.

In the seventh embodiment of the present invention, air currents present in a space, through which passes a light beam emitted from a beam exit window of the optical scanning device toward the photoconductor, flow in an axial direction of the photoconductor; and the photoconductor is arranged such that a high-sensitivity portion of a distribution of axial sensitivity of the photoconductor comes to a downstream side of the air currents. By means of such a configuration, there can be provided an image forming apparatus which cancels the influence of time-varying deterioration of light quantity due to stains on the beam exit window, to thus prevent deterioration of image quality.

Figure 14:
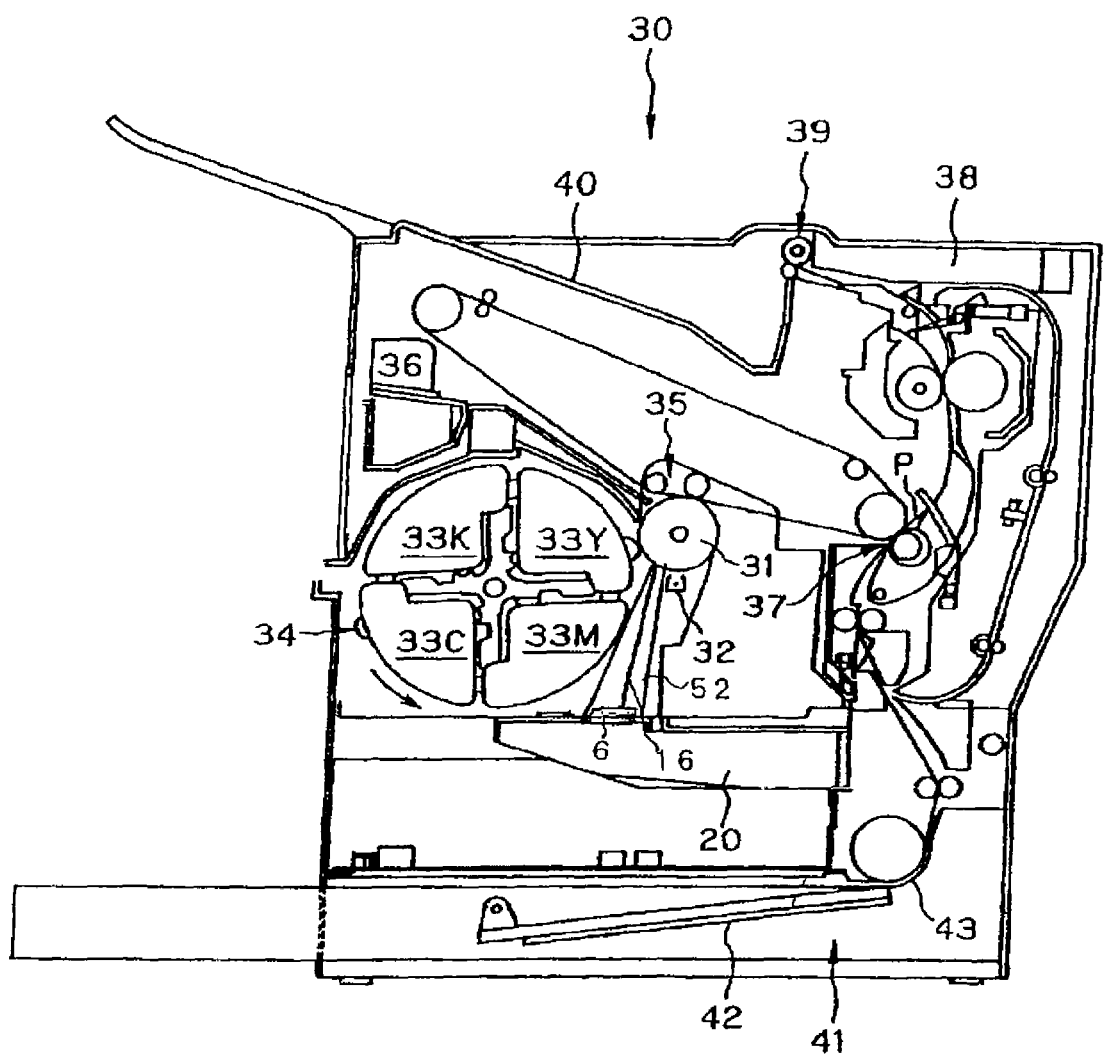
FIG. 14 is a diagrammatic cross-sectional view showing the entire configuration of an embodiment of an image forming apparatus (an electrophotographic laser printer) using an electrophotographic process of the present invention.

The optical scanning device of the present invention as mentioned above is particularly effective for a case where an image forming apparatus is set in an environment where the apparatus is susceptible to stains. FIG. 14 is a diagrammatic cross-sectional view showing the entire configuration of an image forming apparatus (an electrophotographic laser printer) 30 of an embodiment which employs electrophotographic processes of the present invention suitable for application of the optical scanning device of the present invention.

The common features of the image forming apparatus of the first to seventh embodiments will be described hereinbelow.

The image forming apparatus 30 of the this embodiment uses a single image carrier (photosensitive drum) 31; charging means 32 formed from a single corona charging means; the optical scanning device 20 of the present invention which causes the deflected light beam 16 to scan back and forth in a deflected manner in the direction of a generatrix of the image carrier (photosensitive drum) 31; and a rotary development unit 34—in which a yellow development cartridge 33Y, a magenta development cartridge 33M, a cyan development cartridge 33C, and a black development cartridge 33K are arranged so as to be rotationally switchable around the center of rotation—are disposed around the image carrier 31 from upstream to downstream in the rotational direction thereof.

As a result of adoption of such a configuration, an electrostatic latent image is formed by uniformly charging the image carrier 31 with use of the charging means 32 and subjecting the image carrier to exposure and electric discharge caused by the deflected light beam 16 emitted from the optical scanning device 20. Thus, the electrostatic latent image is developed as toner images by any of the sequentially-selected development cartridges 33Y, 33M, 33C, and 33K of the rotary development unit 34. Primary transfer of the thus-sequentially-formed yellow, magenta, cyan, and black toner images sequentially onto an intermediate transfer belt (intermediate transfer medium) 36 is repeated by a primary transfer bias applied to the primary transfer member (a transfer roller) 35. The toner images are sequentially superposed one on top of the other on the intermediate transfer belt 36, so that the toner images constitute a full-color image.

The full-color image which the toner images have constituted is transferred to a recording medium P, such a sheet, through secondary transfer by means of a secondary transfer roller 37, and the toner image is fixed on the recording medium P as a result of having passed through a pair of fixing rollers of a fixing unit 38. The recording medium is discharged onto a paper output tray 40 formed in an upper portion of the apparatus, by means of a pair of sheet output rollers 39. In the drawings, reference numeral 41 designates a sheet-feeding unit and has a sheet-feeding section consisting of a sheet-feeding cassette 42 which retains the recording mediums P in a stacked manner and a pickup roller 43 for feeding the recording mediums P one at a time from the sheet-feeding cassette 42. The image forming apparatus according to the embodiment of the present invention is configured to use the intermediate transfer medium as a transfer medium.

In the above, the optical scanning device of the present invention and the image forming apparatus using the same have been described on the basis of the principle and embodiment thereof. However, the present invention is not limited to the embodiment and is susceptible to various modifications.

What is claimed is:

1. An image forming apparatus comprising:
   a photoconductor, adapted such that an electrostatic latent image is formed thereon and extending in a first direction;
   an optical scanner, operable to scan and expose the photoconductor;
   a charging device, operable to charge the photoconductor; and
   a fan, operable to generate an air current around the photoconductor, wherein
   the fan is disposed at one side of the photoconductor in the first direction, and
   a scanning direction in which the optical scanner scans the photoconductor is only opposite to a current direction in which the air current flows.

2. The image forming apparatus according to claim 1, further comprising:
   a developer, adapted to develop the latent image as a visible toner image; and
   a transfer device, adapted to transfer the toner image on a transfer medium.

3. The image forming apparatus according to claim 1, wherein the fan is disposed at a write start side in the scanning direction.

4. The image forming apparatus according to claim 1, wherein the fan is disposed at a write end side in the scanning direction.

* * * * *